US007392388B2

(12) United States Patent
Keech

(10) Patent No.: US 7,392,388 B2
(45) Date of Patent: Jun. 24, 2008

(54) SYSTEMS AND METHODS FOR IDENTITY VERIFICATION FOR SECURE TRANSACTIONS

(75) Inventor: Winston Donald Keech, Little Beck (GB)

(73) Assignee: Swivel Secure Limited, North Yorkshire (GB)

( * ) Notice: Subject to any disclaimer, the term of this patent is extended or adjusted under 35 U.S.C. 154(b) by 440 days.

(21) Appl. No.: 09/915,271

(22) Filed: Jul. 27, 2001

(65) Prior Publication Data

US 2002/0029342 A1    Mar. 7, 2002

Related U.S. Application Data

(63) Continuation-in-part of application No. 09/663,281, filed on Sep. 15, 2000.

(30) Foreign Application Priority Data

Sep. 7, 2000    (GB) .................................. 0021964.2

(51) Int. Cl.
*H04L 9/00*    (2006.01)
(52) U.S. Cl. .......................... 713/170; 713/168; 713/169
(58) Field of Classification Search ................. 713/168, 713/184, 169, 170; 705/64, 72, 75
See application file for complete search history.

(56) References Cited

U.S. PATENT DOCUMENTS 4,697,072 A * 9/1987 Kawana ...................... 235/380

4,720,860 A * 1/1988 Weiss .......................... 713/184

(Continued)

FOREIGN PATENT DOCUMENTS

EP    0 817 518 A2    6/1997

(Continued)

OTHER PUBLICATIONS

C. H. Meyer and S. M. Matyas, Some cryptographic principles of authentication in electronic funds transfer systems, 1981, ACM Press, SIGCOMM '81: Proceedings of the seventh symposium on Data communications, pp. 73-88.*

(Continued)

*Primary Examiner*—Nasser Moazzami
*Assistant Examiner*—David Garcia Cervetti
(74) *Attorney, Agent, or Firm*—Greenberg Traurig LLP; James E. Goepel; John Wittenzellner

(57) ABSTRACT

Secure identification of a user in an electronic communications environment, wherein a host computer communicates with a plurality of electronic devices operated by the user. The user is issued a user code, known only to the user and stored in the host computer. User identification involves the host computer generating a pseudo-random security string and applying the user code to the pseudo-random security string to generate a transaction code. The host computer also transmits the pseudo-random security string to one of the electronic devices which displays the pseudo-random security string to the user. The user generates the transaction code by applying their known user code to the displayed pseudo-random security string. The user enerated transaction code is entered into an electronic device, then transmitted back to the host computer. Positive identification is achieved when the host computer determined transaction code matches the user generated transaction code.

25 Claims, 24 Drawing Sheets

U.S. PATENT DOCUMENTS

| | | | | | |
|---|---|---|---|---|---|
| 4,885,778 | A | * | 12/1989 | Weiss | 713/184 |
| 4,998,279 | A | * | 3/1991 | Weiss | 340/5.52 |
| 5,016,277 | A | * | 5/1991 | Hamilton | 713/150 |
| 5,023,908 | A | * | 6/1991 | Weiss | 713/184 |
| 5,056,141 | A | * | 10/1991 | Dyke | 340/5.27 |
| 5,058,161 | A | * | 10/1991 | Weiss | 380/270 |
| 5,097,505 | A | * | 3/1992 | Weiss | 380/270 |
| 5,163,097 | A | * | 11/1992 | Pegg | 713/183 |
| 5,168,520 | A | * | 12/1992 | Weiss | 713/184 |
| 5,177,789 | A | * | 1/1993 | Covert | 713/184 |
| 5,195,133 | A | * | 3/1993 | Kapp et al. | 705/75 |
| 5,196,840 | A | * | 3/1993 | Leith et al. | 340/5.26 |
| 5,237,614 | A | * | 8/1993 | Weiss | 713/159 |
| 5,239,583 | A | * | 8/1993 | Parrillo | 705/72 |
| 5,251,259 | A | * | 10/1993 | Mosley | 713/184 |
| 5,297,202 | A | * | 3/1994 | Kapp et al. | 705/75 |
| 5,324,922 | A | * | 6/1994 | Roberts | 235/375 |
| 5,343,529 | A | * | 8/1994 | Goldfine et al. | 705/75 |
| 5,355,413 | A | * | 10/1994 | Ohno | 713/159 |
| 5,361,062 | A | * | 11/1994 | Weiss et al. | 340/5.26 |
| 5,367,572 | A | * | 11/1994 | Weiss | 713/184 |
| 5,408,417 | A | * | 4/1995 | Wilder | 705/5 |
| 5,428,349 | A | * | 6/1995 | Baker | 340/5.54 |
| 5,479,512 | A | * | 12/1995 | Weiss | 380/28 |
| 5,481,509 | A | * | 1/1996 | Knowles | 386/117 |
| 5,485,519 | A | * | 1/1996 | Weiss | 713/185 |
| 5,530,438 | A | * | 6/1996 | Bickham et al. | 340/5.8 |
| 5,537,313 | A | * | 7/1996 | Pirelli | 705/28 |
| 5,606,614 | A | * | 2/1997 | Brady et al. | 713/184 |
| 5,611,051 | A | * | 3/1997 | Pirelli | 705/10 |
| 5,627,355 | A | * | 5/1997 | Rahman et al. | 235/380 |
| 5,646,998 | A | * | 7/1997 | Stambler | 705/76 |
| 5,655,020 | A | * | 8/1997 | Powers | 713/185 |
| 5,657,388 | A | * | 8/1997 | Weiss | 713/184 |
| 5,661,284 | A | * | 8/1997 | Freeman et al. | 235/380 |
| 5,661,807 | A | * | 8/1997 | Guski et al. | 713/159 |
| 5,668,876 | A | * | 9/1997 | Falk et al. | 380/271 |
| 5,724,423 | A | | 3/1998 | Khello | |
| 5,754,652 | A | | 5/1998 | Wilfong | |
| 5,757,917 | A | * | 5/1998 | Rose et al. | 705/79 |
| 5,778,173 | A | * | 7/1998 | Apte | 713/201 |
| 5,793,302 | A | * | 8/1998 | Stambler | 340/5.86 |
| 5,936,221 | A | * | 8/1999 | Corder et al. | 235/380 |
| 5,936,541 | A | * | 8/1999 | Stambler | 340/5.22 |
| 5,940,511 | A | * | 8/1999 | Wilfong | 713/183 |
| 5,971,272 | A | * | 10/1999 | Hsiao | 235/380 |
| 5,988,497 | A | * | 11/1999 | Wallace | 235/382.5 |
| 6,000,832 | A | * | 12/1999 | Franklin et al. | 700/232 |
| 6,002,918 | A | * | 12/1999 | Heiman et al. | 340/7.38 |
| 6,003,014 | A | * | 12/1999 | Lee et al. | 705/13 |
| 6,018,717 | A | * | 1/2000 | Lee et al. | 705/13 |
| 6,078,908 | A | | 6/2000 | Schmitz | |
| 6,091,817 | A | * | 7/2000 | Bertina et al. | 380/260 |
| 6,095,412 | A | * | 8/2000 | Bertina et al. | 235/380 |
| 6,163,771 | A | * | 12/2000 | Walker et al. | 705/18 |
| 6,175,922 | B1 | * | 1/2001 | Wang | 713/182 |
| 6,182,894 | B1 | | 2/2001 | Hackett et al. | |
| 6,185,682 | B1 | * | 2/2001 | Tang | 713/168 |
| 6,189,098 | B1 | | 2/2001 | Kaliski, Jr. | |
| 6,216,183 | B1 | * | 4/2001 | Rawlins | 710/100 |
| 6,246,769 | B1 | * | 6/2001 | Kohut | 380/45 |
| 6,282,656 | B1 | * | 8/2001 | Wang | 713/201 |
| 6,285,916 | B1 | * | 9/2001 | Kadaba et al. | 700/222 |
| 6,289,324 | B1 | * | 9/2001 | Kawan | 705/41 |
| 6,332,192 | B1 | * | 12/2001 | Boroditsky et al. | 713/168 |
| 6,343,284 | B1 | | 1/2002 | Ishikawa et al. | 705/67 |
| 6,343,360 | B1 | | 1/2002 | Feinleib | 713/1 |
| 6,484,260 | B1 | * | 11/2002 | Scott et al. | 713/186 |
| 6,539,363 | B1 | * | 3/2003 | Allgeier et al. | 705/39 |
| 6,594,759 | B1 | * | 7/2003 | Wang | 713/182 |
| 6,687,350 | B1 | * | 2/2004 | Landry et al. | 379/144.04 |
| 6,732,278 | B2 | * | 5/2004 | Baird et al. | 726/7 |
| 6,748,367 | B1 | * | 6/2004 | Lee | 705/66 |
| 6,760,796 | B1 | * | 7/2004 | Rossmann et al. | 710/72 |
| 6,816,974 | B1 | * | 11/2004 | Nurmi et al. | 726/16 |
| 6,834,271 | B1 | * | 12/2004 | Hodgson et al. | 705/72 |
| 6,836,765 | B1 | * | 12/2004 | Sussman | 705/75 |
| 7,043,635 | B1 | * | 5/2006 | Keech | 713/168 |
| 2002/0013904 | A1 | * | 1/2002 | Gardner | 713/184 |
| 2004/0236819 | A1 | * | 11/2004 | Anati et al. | 709/200 |

FOREIGN PATENT DOCUMENTS

| | | |
|---|---|---|
| EP | 0 921 487 A2 | 6/1999 |
| EP | 0 532 231 A2 | 3/2002 |
| GB | 2 279 541 A | 6/1994 |
| JP | 63310257 | 12/1988 |
| JP | 11306141 | 11/1999 |
| JP | A-11-316729 | 11/1999 |
| WO | WO 95/19593 | 7/1995 |
| WO | WO 96/00485 | 1/1996 |
| WO | WO 99/00958 A | 1/1999 |
| WO | WO 99/57847 A | 11/1999 |
| WO | WO 00/57613 | 9/2000 |
| WO | WO 00/57613 A | 9/2000 |
| WO | WO 01/73530 A2 | 10/2001 |

OTHER PUBLICATIONS

Kwangjo Kim, Sangjoon Park, Joonsang Baek: "Improving Fairness and Privacy of Zhou-Gollman's Fair Non-repudiation Protocal", Proc. of 1999 ICPP Workshops on Security (IWSEC), 1999, pp. 140-145.

* cited by examiner

SYSTEMS AND METHODS FOR IDENTITY VERIFICATION FOR SECURE TRANSACTIONS

CROSS-REFERENCE TO RELATED APPLICATIONS

The present application is a continuation-in-part of U.S. patent application Ser. No. 09/663,281, filed Sep. 15, 2000 which claims priority from U.K. Patent Application Number GB 0021964.2, filed Sep. 7, 2000, both of which are incorporated herein by reference in their entirety.

FIELD OF THE INVENTION

The present invention relates to the field of secure transactions and more specifically to the verification of a user's identity for conducting transactions.

BACKGROUND OF THE INVENTION

The present invention relates to a system and method for identifying a user or device and, optionally, for conducting transactions between the user or device and a third party, for example, by way of a telephone connection or an electronic computer system such as the Internet.

Various systems are know for conducting electronic transactions in a more or less secure manner over a telecommunications link or the like. One well known system is known as electronic funds transfer at point-of-sale (EFTPOS), in which a user is issued with a credit or debit card bearing a unique identification number, usually embossed on the card in human-readable form and also encoded on a machine-readable magnetic strip on the reverse of the card. For further identification purposes, the card typically includes a space for a user permanently to include his or her signature. In use, when a user wishes to make a purchase in, for example, a retail store, he or she presents the debit or credit card to a store employee. The card is then swiped through a card reader, and information relating to the identity of the card, the identity of the retail store and the value of the goods or services being purchases is transmitted by way of a telephone connection to a remote computer server operated by the card issuer (normally a bank or suchlike). The remote computer server checks that the user's card account contains sufficient funds or credit to cover the proposed transaction, checks that the user's card account is currently operational (for example, to check that the card has not been reported stolen), and then issues a confirmation signal back to the card reader to indicate that the transaction may be authorized. The store employee must then obtain a specimen of the user's signature and compare this with the signature on the reverse of the card so as to check the identity of the user. If the signatures appear to match, the store employee operates the card reader to complete the transaction, and the funds required to cover the transaction are then electronically transferred from the user's card account to the retail store. If the signatures do not appear to match, then the store employee may request additional proof of identification before authorizing the transaction, or may simply refuse the transaction and retain the user's card, which may have been stolen, thereby preventing any unauthorized transfer of funds. This system is open to fraudulent abuse, since it is possible for a card to be stolen and for a thief to forge the signature of an authorized user.

In a development of this system, a card user may be issued with a personal identification number (PIN), which is usually a four digit code, and which is theoretically known only to the user and to the card issuer. Instead of or in addition to providing a specimen of his or her signature at the point-of-sale, the card user is required to enter his or her PIN into the card reader, and this information is transmitted to the remote computer server together with the card and retail store identification data and data regarding the value of the transaction. By providing an extra identification check by way of the PIN, this system helps to prevent fraud by forgery of signatures, but is still not completely secure because the PIN does not change between transactions, and may therefore be intercepted together with card identification data when being transmitted between the card reader and the remote server. Furthermore, it is possible for a thief to observe a user entering his or her PIN into a card reader and to remember the PIN. If the thief is also able to obtain card identification details, for example, from a discarded till receipt or through conspiracy with the store employee, it is a simple matter to produce a fake card including all the appropriate identification information for later fraudulent use, or even to rob the authorized card user of his or her card.

The Protocol of the present invention is currently the only identity verification solution available that can be used across all platforms, using a common user interface. A number of other attempts to solve the problem of identity verification are currently available and include Public Key Infrastructure (PKI), SMART Cards, and biometrics.

A Public Key Infrastructure is a combination of hardware and software products, policies and procedures. PKI provides the basic security required to carry out electronic business so that users, who do not know each other, or are widely distributed, can communicate securely through a chain of trust. PKI is based on digital IDs known as 'digital certificates' which act like 'electronic passports' and bind the user's digital signature to his or her public key. The PKI approach is only applicable for Internet or other transactions that use a computer because the complexity of the software at the users' end of the transaction requires significant computing resources. The PKI approach is not well suited to high volume transaction processing because of this complexity.

Smart Cards are a response to the problem of credit/debit card fraud. Smart Cards are cards that have a microchip embedded within the card which enables personal details about the cardholder to be stored securely on the card, which can then be used to verify the identity of the person using the card. The Smart Card system relies upon there being a Smart Card reading apparatus at the point of sale. Currently, few high street merchants have invested in such equipment, and recent industry estimates expect a hybrid smart card/magnetic strip environment for the next 10-15 years. In addition, smaller or independent retailers find the cost of such equipment is a deterrent to uptake. Few Smart Card systems address the problem of "card not present" fraud such as e-commerce, m-commerce, interactive TV and telephone order unless the consumers invest in Smart-Card readers for the home. Similarly, any Smart Card can be copied ("skimmed/cloned") and can subsequently be used fraudulently in card not present situations. Most major card issuers have plans to roll out such Smart Cards within the next few years, although the costs of the equipment, the cards themselves and the availability of the chips may delay this process. The present invention has been designed to be able to act as a security overlay to such Smart Card systems and can make any transaction as secure as those for which the Smart Cards are designed.

A number of companies are currently developing biometric solutions to the problem of cardholder verification. The Biometric systems can use fingerprints, voice recognition, retinal scans or tissue samples to positively identify the cardholder. Similar to smart cards these biometric systems would require complex and costly equipment at the point of sale and would not provide any protection against fraud in card not present situations.

BRIEF SUMMARY OF THE INVENTION

According to a first aspect of the present invention, there is provided a coded identification system, the system comprising an electronic computer, a specific electronic communications device that is operable to be in communication with the electronic computer, and at least one electronic communications device that is operable to be in communication with the electronic computer, wherein the electronic computer includes data relating to the specific electronic communications device, including a permanent identification code, a mask code and an identification code enabling electronic communication between the electronic computer and the specific electronic communications device, and wherein the permanent identification code is input to the at least one electronic communications device and transmitted to the electronic computer, the electronic computer generates a pseudo-random string and transmits this to the specific electronic communications device, the mask code is applied to the pseudo-random string so as to generate a volatile identification code in accordance with predetermined rules, the volatile identification code is transmitted back to the electronic computer by the specific electronic communications device or the at least one electronic communications device, the electronic computer checks the volatile identification code transmitted thereto against a volatile identification code obtained by applying the mask code to the pseudo-random string in accordance with the predetermined rules, and in which a positive identification is made when the volatile identification codes are found to match by the electronic computer.

According to a second aspect of the present invention, there is provided a method for identifying a specific electronic communications device or user thereof to an electronic computer having stored therein data relating to the specific electronic communications device or user thereof, including a permanent identification code, a mask code and an identification code enabling communication between the electronic computer and the specific electronic communications device, wherein the permanent identification code is input to at least one electronic communications device and transmitted thereby to the electronic computer, the electronic computer associates the permanent identification code with the identification code enabling communications there between and the specific electronic communications device and generates a pseudo-random string before transmitting this to the specific electronic communications device, the mask code is applied to the pseudo-random string in accordance with predetermined rules so as to generate a volatile identification code, the volatile identification code is input to the specific electronic communications device or at least one electronic communications device and transmitted to the electronic computer where it is compared with a volatile identification code generated therein by applying the mask code to the pseudo-random string, and a positive identification is made when the volatile identification codes match.

The specific electronic communications device may be a separate device from the at least one electronic communications device, or may be the same device. For example, the specific electronic communications device may be a mobile telephone, a pager, a land-line telephone, a personal digital assistant or a computer which may be owned or specifically operated by a given person. The at least one electronic communications device may be an electronic funds transfer (EFT) or electronic funds transfer at point-of-sale (EFTPOS) terminal, or may be the same mobile telephone, pager, land-line telephone, personal digital assistant or computer which may be owned or specifically operated by the person as hereinbefore described.

The permanent identification code may be supplied to a user in the form of a card bearing human and/or machine-readable data.

The identification code enabling electronic communication between the electronic computer and the specific electronic communications device may be a mobile telephone or pager number where the specific electronic communications device is a mobile telephone, pager or personal digital assistant, or may be an e-mail address or similar code allowing specific communication with a given specific electronic communications device.

Where the specific electronic communications device is a mobile telephone or the like, the pseudo-random string may be transmitted in the form of a text message under the short messaging service (SMS) protocol. Other well-known communications protocols may be employed where appropriate, depending on the nature of the specific electronic communications device.

Embodiments of the present invention provide additional security of identification in a number of ways. Firstly, in addition to requiring the person to have access to the permanent identification code, the system requires the person to be in possession of an appropriate specific electronic communications device. Secondly, because the system requires the user to cause his or her mask code to operate on the pseudo-random string so as to generate a volatile identification code in accordance with the predetermined rules, without the mask code being electronically transmitted together with the permanent identification code, it is difficult for an unauthorized person to intercept communications between the electronic computer, the specific electronic communications device and/or the at least one electronic communications device so as to determine the mask code and the permanent identification code.

It will be appreciated that the present invention extends to situations where it is required to establish a secure identification of a specific electronic communications device rather than of a person as such. For example, the present invention may be used as part of a secure "hand-shaking" protocol between remote computers, serving positively and securely to identify the specific electronic communications devices, which may itself be an electronic computer, to the electronic computer. Both the electronic computer and the specific electronic communications device will have the mask code stored within their memories but will not communicate the mask code between each other except by way of a secure connection, ideally entirely separate from their normal means of communication.

The mask code may take various forms. In a currently preferred embodiment, a person is issued with or selects a four digit numerical string, for example, 3928, analogous to the well known PIN codes currently used when operating automated teller machines (ATMs). However, different lengths of mask code may be used as appropriate. The pseudo-random string (which may be numeric, alphanumeric or any other combination of characters) transmitted to the specific electronic communications device in response to a signal sent by the at least one electronic communications device is displayable thereon in a predetermined form, with the characters making up the pseudo-random string being displayed preferably as a linear array. The person operating the specific electronic communications device then takes the first digit of his or her mask code, in this example 3, and notes the character in third position (say from left to right) along the pseudo-random string. The person then takes the second digit of his or her mask code, in this example 9, and notes the character in ninth position along the pseudo-random string, and so on for the digits 2 and 8 of the mask code. The characters selected from the pseudo-random string form the volatile identification code which is then input into the at least one electronic communications device and transmitted to the electronic computer for verification. Alternatively, the volatile identification code may be transmitted to the electronic computer by way of the specific electronic communication device. If the volatile identification code received by way of the electronic computer corresponds to an expected volatile identification code calculated by the electronic computer applying the mask code to the pseudo-random string, a positive identification is take to have been made. The prime security feature is that the mask code is never transmitted between the electronic computer, the specific electronic communications device or the at least one electronic communications device, and is thus safe from interception by unauthorized third parties. The secondary security feature is that a person must be in possession of his or her own specific electronic communications device, since the electronic computer will transmit the pseudo-random strong only thereto.

For additional security, after the volatile identification code has been transmitted to the electronic computer for verification and found to match a volatile identification code generated by the electronic computer, the electronic computer may transmit a message to the specific electronic communications device requesting that the person confirms that the identification is correct. Only when the person responds affirmatively to the message by transmitting a confirmatory message from the specific electronic communications device to the electronic computer so the identification process finally completed.

In some embodiments of the present invention, it is not necessary for a person operating the specific electronic communications device to view the pseudo-random string and to apply the mask code manually thereto. Instead, a computer program may be provided in a memory of the specific electronic communications device which allows the person to enter his or her mask code when prompted, and which then applies the mask code automatically to the pseudo-random string, returning the appropriate volatile identification code for input into the specific electronic communications device or the at least one electronic communications device.

In a further development, at least one position in the pseudo-random strong may be chosen to contain a character representative of a predetermined parameter or condition. Advantageously, the position of the character and its representational meaning are know only to the electronic computer and the person operating the specific electronic communications device. For example where the electronic computer is operated by a bank and the permanent identification code is the person's bank account number, then one of the positions in the pseudo-random string, say the seventh, may be chosen to be representative of a balance of the person's bank account, with 0 for example indicating zero funds and 9 indicating a balance over £1000, with FIGS. 1 to 8 being representative of balances there between on a linear scale. Alternatively, for greater security, the at least one position in the pseudo-random strong may be chosen to contain a flag character, with say any one of the digits 1 to 5 indicating a balance below £500 and any one of the digits 6 to 9 indicating a balance above £500. It will be apparent that many other representational schemas may be applied so as to convey information in the pseudo-random string. Because the position and meaning of the at least on representative character in the pseudo-random strong is preferably selectable by the person rather than following a set format which may become known to unauthorized third parties, it remains difficult to extract meaningful information should the pseudo-random string be intercepted during transmission. Furthermore, the person may be required to identify the position and/or meaning of the at least one representative character after receiving the pseudo-random string, thereby providing an additional layer of security in the identification process.

It will be apparent that in the embodiment described hereinabove, the pseudo-random string must be at least ten characters long, since a mask code made up of the numbers 0 to 9 requires at least ten positions along the pseudo-random string to be functional. However, a person of ordinary skill will appreciate that different mask codes and string lengths may be used as required by selecting appropriate coding schemas. It is to be emphasized that the pseudo-random string issued by the electronic computer in response to an identification request from the at least one electronic communications device will be different for each request, and that it will therefore be extremely difficult to determine a given mask code given a series of potentially interceptable pseudo-random strings and volatile identification codes. Indeed, in embodiments where the specific electronic communications device is a separate device from the at least one electronic communications device, for example, a mobile telephone and an EFTPOS terminal respectively, then the pseudo-random string and the volatile identification code are never transmitted along the same route, for example, a given temporary telephone connection. In embodiments where the specific electronic communications device is the at least one electronic communications device, for example, a remote computer terminal adapted for secure connection to the electronic computer, then the pseudo-random string may be transmitted along the same route, but not together at the same time. In the latter embodiment, an initial request to log on to the electronic computer may only be considered if it emanates by way of a direct modem link from a predetermined telephone number associated with the person, the pseudo-random string is then transmitted back along the modem link to the remote terminal and the volatile identification code transmitted to the electronic computer by way of the same direct modem connection.

In a particularly preferred embodiment, the electronic computer is operated by a debit or credit card issuer, the specific electronic communications device is a mobile telephone, the at least one electronic communications device is an EFTPOS terminal operated by a retailer, the permanent identification code is a person's debit or credit card account number, the mask code is a four digit number as described above, the identification code enabling electronic communications between the electronic computer and the specific electronic communications device is a telephone number of the mobile telephone. It is to be understood that the debit or credit card issuer may be a bank which issues standard debit cards enabling purchases to be made against funds in the person's current account or standard credit cards enabling purchases to be made against a credit account, or may alternatively be a specialist service provider issuing dedicated debit cards to subscribers, where the subscribers must arrange for funds to be transferred to the service provider as requires so as to keep at least a minimum positive balance associated with their dedicated debit card accounts.

When a person first applies for an account from the card issuer, he or she is issued with an account number and a card which bears the account number and name of the account holder in the usual way, for example by way of embossing the card with human-readable indicia and by way of providing machine-readable data on a magnetic strip on a reverse portion of the card. The person must supply the usual details, such as name and home address, to the card issuer, together with his or her mobile telephone number. It is also necessary for the mask code to be issued to the card issuer or to be agreed between the card issuer and the person. The mask code is preferably issued separately from the card, for example by way of separate postal deliveries, and is never transmitted together with the account number and/or telephone number. When the person wishes to make a purchase using the debit or credit card, he or she presents the card to a retailer. The retailer then swipes the card through the EFTPOS terminal, which then contacts a main computer operated by the card issuer.

The card/account number is transmitted to the main computer by way of a modem link, together with transaction details including the price of the purchase being made. The main computer then correlates the card/account number with the person's mobile telephone number and, if there are sufficient funds in the account to cover the intended purchase, generates a pseudo-random string which is transmitted to the mobile telephone by way, for example of and SMS message over a cellular telecommunications link. The person applies the mask code to the pseudo-random string as hereinbefore described, and then gives the volatile identification code thus generated to the retailer. The retailer, in turn, enters the volatile identification code into the EFTPOS terminal, which then transmits this data back to the main computer where it is correlated with the person's account details and compared with a volatile identification code temporarily stored in the main computer and generated therein by applying the mask code to the pseudo-random string independently of the person. If the volatile identification codes match, the main computer transmits a confirmation message to the EFTPOS terminal authorizing the transaction, and the necessary funds to cover the purchase are then transferred automatically to the retailer and debited from the person's card account.

In the event that there are insufficient funds in the person's account to cover the cost of the purchase, the main computer may issue a signal to the EFT terminal that the transaction is not authorized, and may issue a message to the mobile telephone advising the person to add finds to the account. In the event that the volatile identification codes are found not to match, then the main computer may issue a signal to the EFTPOS terminal so as to inform the retailer, who may then ask the person to check that the correct volatile identification code has been generated and to provide the correct code for transmission to the main computer. If the person gives the wrong volatile code more than a predetermined number of times, for example three times, then the main computer may suspend that person's account temporarily for reasons of suspicion of fraudulent use. The authentic card holder must then apply to the card issuer, together with suitable verification of his or her identity, before the account is reactivated and/or a new account and card is issued.

In some embodiments, the person may communicate with the central computer directly by way of his or her mobile telephone. This is possible because transmissions from a mobile telephone include details of the number of telephone number of the mobile telephone, and because the main computer is able to correlate mobile telephone numbers with card accounts. One useful feature that may be provided is an emergency account lock that may be activated in the event that the credit or debit card or even the mobile telephone is stolen. Such a lock may be activated by transmitting a predetermined lock code, for example 9999, to the main computer. Alternatively, or in addition, a lock code may be issued in mask code format, which is useful in the event that a person is robbed and threatened with violence so as so hand over his or her card and mobile telephone, together with his or her mask code.

A further useful security feature may be provided wherein, after the volatile identification code has been transmitted to the electronic computer for verification and found to match a volatile identification code generated by the electronic computer, the electronic computer may transmit a message to the mobile telephone requesting that the person confirms that the transaction is authorized. The message may be sent in SMS or voicemail format, and may include details of the transaction. Only when the person responds affirmatively to the message by transmitting a confirmatory message from the mobile telephone to the electronic computer is the transaction finally authorized.

The credit or debit card of this embodiment of the present invention may also be used to make secure purchases over the Internet. In this scenario, the at least one electronic communications device may be a computer server operated by an Internet retailer. When a person wishes to make a secure purchase, he or she submits the account number to the server, by way of e-mail or through the retailer's website, and the server then transmits the account details and purchase details to the main computer operated by the card issuer as before. An SMS message containing the pseudo-random string is then transmitted to the person's mobile telephone, and the person then causes a volatile identification code to be generated and then submitted to the retailer's server from where it is transmitted to the main computer for verification before the transaction is authorized and funds released.

A person may have more than one account with the card issuer, and may accordingly select or be assigned more than one mask code, one for each account. Alternatively or in addition, more than one mask code may be assigned to each account, and the main computer may indicate by way of one or more characters in the pseudo-random string that it is expecting the person to apply a particular mask code, selected from a plurality of prearranged mask codes, to the pseudo-random string, thus providing an additional level of security.

It is to be appreciated that the present invention is not limited to credit or debit card transaction, but provides a secure method and system of identification in a wide variety of situations. For example, access to a building or vehicle may be controlled by providing a central computer holding details of all people authorized to enter the building or vehicle, and a swipe card bearing a unique identification number or code in magnetically-coded format may be issued to each person authorized to enter the building or vehicle. At entrances to the building or vehicle, electronic locks linked to card scanners and electronic keypads may be provided, the card scanners and keypads allowing communication with the central computer. When an authorized person wishes to enter the building or vehicle, he or she swipes the swipe card through the card scanner, which then transmits the unique identification number or code to the central computer. The central computer correlates the unique identification number or code with personal details of the person, including a predetermined mask code, and then transmits a pseudo-random string to the keypad for display on a display provided thereon. The person must then apply his or her mask code to the pseudo-random string and enter the volatile identification code thus generated into the keypad, which then transmits the volatile identification code to the central computer for comparison with a volatile identification code generated in the central computer as hereinbefore described. If the volatile identification codes match, then the central computer issues a signal to unlock the electronic lock. Such a system provides a significant advantage over existing electronic locks operated by keying in a predetermined code, because each time a person enters the building or vehicle, he or she will have to enter a different volatile identification code. This means that a potential thief of the like will not be able to gain access to the building or vehicle merely by observing an authorized person keying in an entry code and subsequently entering the same entry code.

Furthermore, it is not necessary to provide a swipe card to each person authorized to enter the building or vehicle. Instead, each person is issued with a unique and memorable permanent identification number or code, which may be input by way of the electronic keypad when access to the building or vehicle is required. The unique permanent identification number or code is then correlated in the central computer with the appropriate mask code and a pseudo-random string transmitted to the electronic keypad for display on a display thereof as before.

It will be appreciated that in the above embodiments, the electronic keypad and optional card scanner form the at least one electronic communications device as well as the specific electronic communications device. For added security, albeit involving additional inconvenience, persons authorized to enter the building or vehicle may be provided with mobile telephones as specific electronic communications devices, with the pseudo-random string being transmitted to the mobile telephone rather than to a display on the electronic keypad.

Alternative uses for the system and method of the present invention include any situation where secure identification of a person in an electronic communications environment is required. For example, the system and method maybe employed for a secure remote log-in to a computer and secure telecommunications in general (e.g. business-to-business e-commerce transactions, air traffic control communications, etc.). The system and method may also be implemented in the context of a vehicle immobilizer and/or alarm, whereby an authorized user of a vehicle is requested to apply a mask code to a pseudo-random string so as to deactivate the immobilizer or alarm.

A further use for the present invention is a secure ticketing system. A supplier of travel tickets, concert tickets, cinema and theater tickets and tickets for sporting events, among others, may issue a "virtual" ticket in the form of a permanent customer identification code and a pseudo-random string transmitted from a host computer to a specific electronic communications device. Upon arrival at a venue or upon request by a ticket inspector, a person to whom the "virtual" ticket has been issued may be required to apply his or her mask code to the pseudo-random string and to provide the virtual identification code generated thereby, together with the permanent customer identification code, to the ticket inspector. The ticket inspector may be provided with an electronic communications device by way of which this information may be transmitted back to the host computer for verification, and to which a verification signal may be sent by the host computer in the event that the person is positively identified as an authorized ticket holder.

Yet another use of the present invention is in a parcel or postal depot, such as a post office, or a catalog store or a warehouse or the like, where people visit to pick up parcels, post or other articles and it is necessary to positively identify a person before handing over the parcels, post or other articles. A person picking up an article will have been issued with a pseudo-random string and, upon collection, is asked to supply a volatile identification code generated by the application of his or her mask code to the pseudo-random string.

According to another aspect of the present invention, there is provided an identity verification secure transaction system comprising a host computer for storing a user code associated with a user and for supplying a pseudo-random security string for a transaction. The host computer determines a one time transaction code by applying the user code to the pseudo-random security string. There is at least one electronic device in electronic communication with the host computer used for administering and completing the transaction by receiving and displaying the pseudo-random security string. The user determines the transaction input code by applying their user code to the pseudo-random security string displayed on the electronic device. The user enters the transaction input code in the electronic device displaying the pseudo-random security string, or in a device in communication with the host computer. The entered user transaction code is sent to the host computer for verification with the one time transaction code. The pseudo-random security string may be displayed and user entry of the transaction code may entered in any combination of devices including an Electronic Funds Transfer Point of Sale (EFT/POS) device, a wireless device associated with the user, a user computer connected via the Internet with the host computer or any device capable of communicating electronically with the host computer. Further, the host computer may transmit the one time transaction code for display on an electronic device, the system may be used to complete a transaction with a merchant through a merchant computer or web site which is in electronic communication with the host computer and a user computer or device. The system may be used to provide security or regulated access to a database or account information.

The present invention also provides a method for verifying an identity for conducting secure transactions in which the system stores information about a user pin associated with a host computer; generates a pseudo-random security string, determines a transaction code by applying the user pin to the pseudo-random security string, and transmits the pseudo-random security string to an electronic device. The electronic device displays the pseudo-random security string so that the user can determine a user transaction input code by applying their user code to the pseudo-random security string. The user enters the transaction input code on the same or a different electronic device in electronic communication with the host computer. The user entered transaction code is transmitted to the host computer for verification that the host computer determined transaction code matches the user entered transaction input code. The system of the present invention completes the transaction, allows access to a database or account information when the host computer determined transaction code matches the user entered transaction input code.

Another aspect of the present invention includes a secure user code entry interface system which is comprised of a secure user code entry interface. The user code entry interface is stored and running on an electronic device where the electronic device has a display. Viewable on the display if the secure user code entry interface which contains at least one active display for entry, by the user, of one digit of the user code per cycle of the interface. The active display of the interface illuminates at least one display digit on the interface and the user keys any key of a keypad or mouse or touches any area of a touch sensitive screen when the illuminated digit matches the digit to be entered in their user code. A random run on time is added to time when the user enters the keystroke so that the active display remains active and therefore information relating to the number entered can not be determined. The secure user interface contains one cycle for each digit of a user code.

According to a still further aspect of the present invention, there is provided an identity verification secure transaction system comprising a host, at least one electronic device, and a secure user interface. The host computer stores information about the user which includes account and user code information. The at least one electronic device is in electronic communication with the host computer and displays the secure user input interface for entry of the user code. The at least one electronic device has at least a display and a user input device. The secure user code entry interface contains at least one cycle for each digit of the user code and contains an active display for entry of the user code. The user enters each digit of the user code by a response through a user input device at a response time when a display digit which corresponds with the appropriate digit of the user code is illuminated in the active display of the interface. After entry of each digit within a cycle is entered a random run on time is added to the time when the user responded in order to extend each cycle of the active display so that the anyone could not determine which digit was selected by viewing the user interface. After entry of the entire user code the entered code is transmitted to the host computer for verification with the host computer stored user code. The user may enter their response by keying any key on a keyboard or mouse or by touching any area of a touch sensitive display.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE PREFERRED EMBODIMENT

Figure 1:
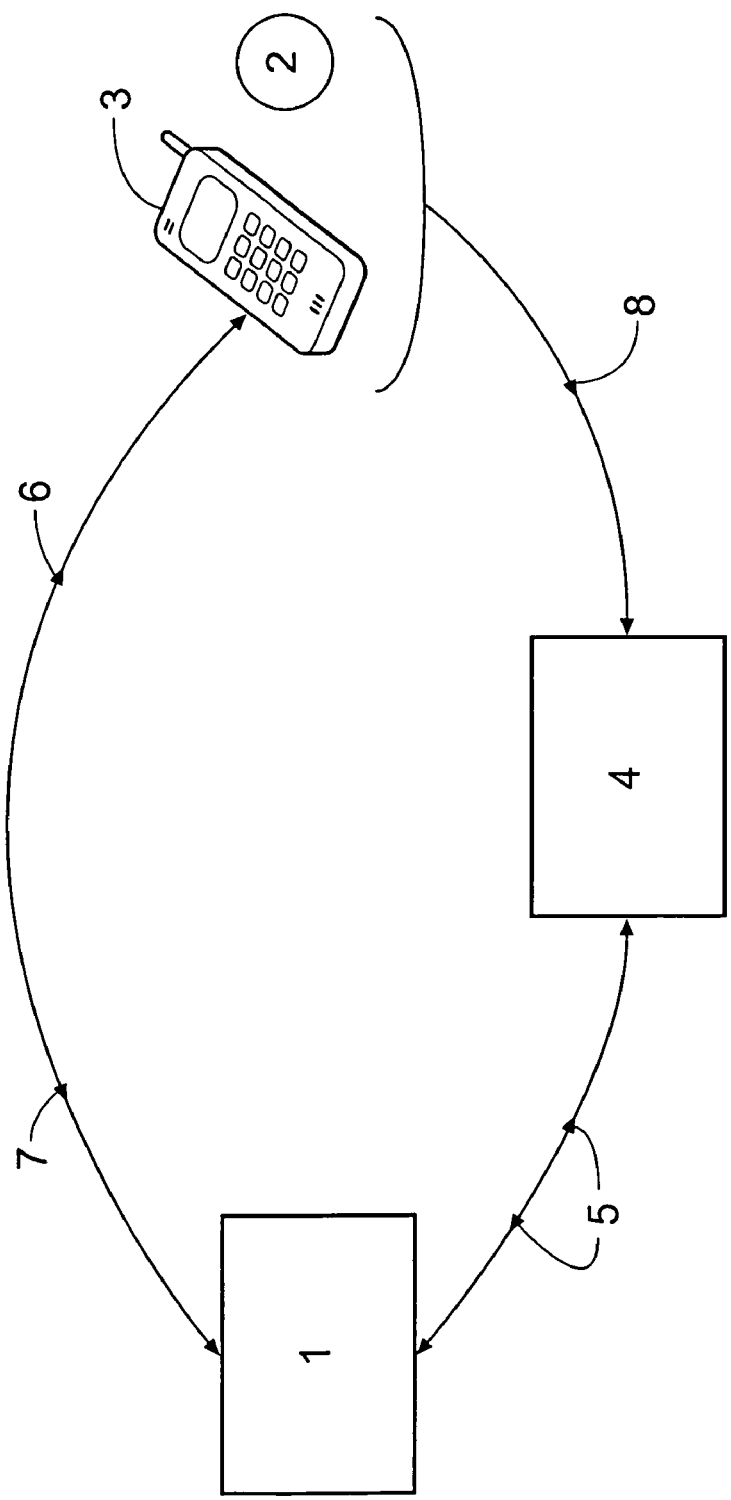
FIG. 1 is a schematic diagram showing a preferred embodiment of the present invention.

FIG. 1 shows a host computer 1 operated by a credit/debit card issuer, a user 2 having a mobile telephone 3, and an EFTPOS terminal 4. The user 2 is issued with a card (not shown) having a unique 16-digit account number embossed and magnetically encoded thereon, this 16-digit account number being correlated in the host computer 1 with account details relating to the user as well as a 4-digit mask code selected by or assigned to the user 2 upon initial registration with the credit/debit card issuer and a unique telephone number of the mobile telephone 3. The 16-digit account number is chosen for a compatibility with existing credit/debit card protocols, and the 4-digit mask code for compatibility with existing PIN protocols. When the user 2 wishes to make a purchase from a retailer (not shown) operating the EFTPOS terminal 4, he or she presents the card, which is then scanned by the EFTPOS terminal 4. Details regarding a purchase are also entered into the EFTPOS terminal 4 by the retailer, and these are transmitted, together with the account number, to the host computer 1 by way of a modem link 5. The host computer 1 then correlates the account number with details of the user 2, including the telephone number of the mobile telephone 3, and generates a 13-digit pseudo-random string which is transmitted to the mobile telephone 3 by way of an SMS or voicemail protocol 6. The first three digits of the pseudo-random string are not random and are reserved to indicate to the user that a received SMS message is from the host computer. For example, the first three digits may be "T1:" or "T2:" or the like, so as to indicate that the host computer 1 is expecting the user 2 to apply a first or a second mask code to the pseudo-random string. The next 10-digits of the pseudo-random string provide sufficient redundancy for any 4-digit mask code to operate thereupon in the manner hereinbefore described. By choosing a string length of 13 digits for the pseudo-random string, compatibility with existing mobile telephone displays and EAN13 (European Article Number) barcode protocols is ensured.

Upon reception of the pseudo-random string by the mobile telephone 3, the user 2 must apply the mask code thereto as hereinbefore described so as to generate a volatile identification code, which is then passed 8 to the retailer and entered into the EFTPOS terminal 4 for transmission to the host computer 1. Alternatively, the volatile identification code may be returned by the user 2 to the host computer 1 by way of the mobile telephone 3. When the host computer 1 receives the volatile identification code, it compares this with a volatile identification code generated within the host computer 1 by applying the mask code to the pseudo-random string and, if the volatile identification codes are found to match, issues a signal to the EFTPOS terminal 4 so as to authorize the purchase and to transfer necessary funds to the retailer. Optionally, before authorizing the transfer of funds, the host computer 1 may send a message to the mobile telephone 3, for example in SMS or voicemail format 6, preferably including details of the transaction, and requesting that the user 2 return a signal 7 so as finally to confirm the transaction. This may provide added peace-of-mind for unusually large transactions and may alert a user 2 in the event that fraudulent use is being made of his or her card.

The present invention may be implemented in both a single and dual channel schema which are disclosed and discussed in relation to FIGS. 2-10.

The Dual Channel protocol is appropriate for all users who own a G2 mobile phone. The types of transaction might include: (1) Electronic Funds Transfer at the Point of Sale (EFT/POS) and (2) Telephone orders. EFT/POS are transactions where the user would make a purchase at a merchant in the normal way and when the credit/debit card is swiped through the card reader, the merchant would be prompted to ask for the customer's transaction affirmation code (TAC) or mask code. The user remembers a their four digit PIN number which is used to determine the TAC from the pseudo-random string, which is given at the point of sale. If the user intends to make multiple purchases within a short space of time or in an area where mobile phone reception is poor the user can elect in advance to use the same TAC for a single day. A telephone order transaction would essentially use the same method as above with the exception that the merchant physically enters the card details in the usual manner before being prompted for the TAC.

Additional features of the dual channel schema are that the customer will be able to choose alternative user-friendly methods of identifying the TAG from the pseudo-random security string, such as an Enigma interface or voice recognition system. An Enigma Interface would include minor modifications to a Security Identification Module ("SIM") card in a phone or pager during manufacture but customers could avoid any calculation of the TAC themselves. Users will be able to key in their PIN and by pressing an additional key of their choice, the phone or pager will automatically compute the resultant TAC, without the customer even seeing the Security String. This computation would be a completely internal, ensuring that only the TAC is displayed, and the PIN is not retained in the mobile phone or pager. A voice recognition interface could be implemented in voice activated phones and be able to compute the appropriate TAC on the simple command "TAC!" from an approved voice.

Customers could also have the option of choosing, when applying for an enabled card, a geometric shape, as will be discussed in more detail below, in which the security string will always be delivered. The customer would simply register their chosen geometric shape to be displayed on screen and then visually apply their PIN pattern to determine the corresponding resultant TAC. This display can be interfaced by a Wireless Access Protocol ("WAP") enabled mobile phone, a third generation ("G3") mobile phone, an Internet site display prompt or a secondary dedicated terminal placed at the point of sale.

The protocol of the present invention may be 'bolted-on' to an existing database server and can at least run on unmodified Electronic Funds Transfer or Point of Sale ("EFT/POS") hardware such as: (1) American Express ("AMEX"); (2) Split dial Electronic Point of Sale "EPOS"); and (3) VISA Address Verification System ("AVS3"). In addition, the dual channel protocol can be used to upgrade the security of Mondex systems (these already use a 4-PIN digit at POS).

The dual demand schema may use a standard second generation ("G2") mobile phone, a G3 mobile phone, or WAP device to receive the security string. If these devices include a modified SIM card interface for this security string the device may also include a graphical user interface ("GUI") or an Enigma interface to simplify the derivation of the TAC.

Figure 2:
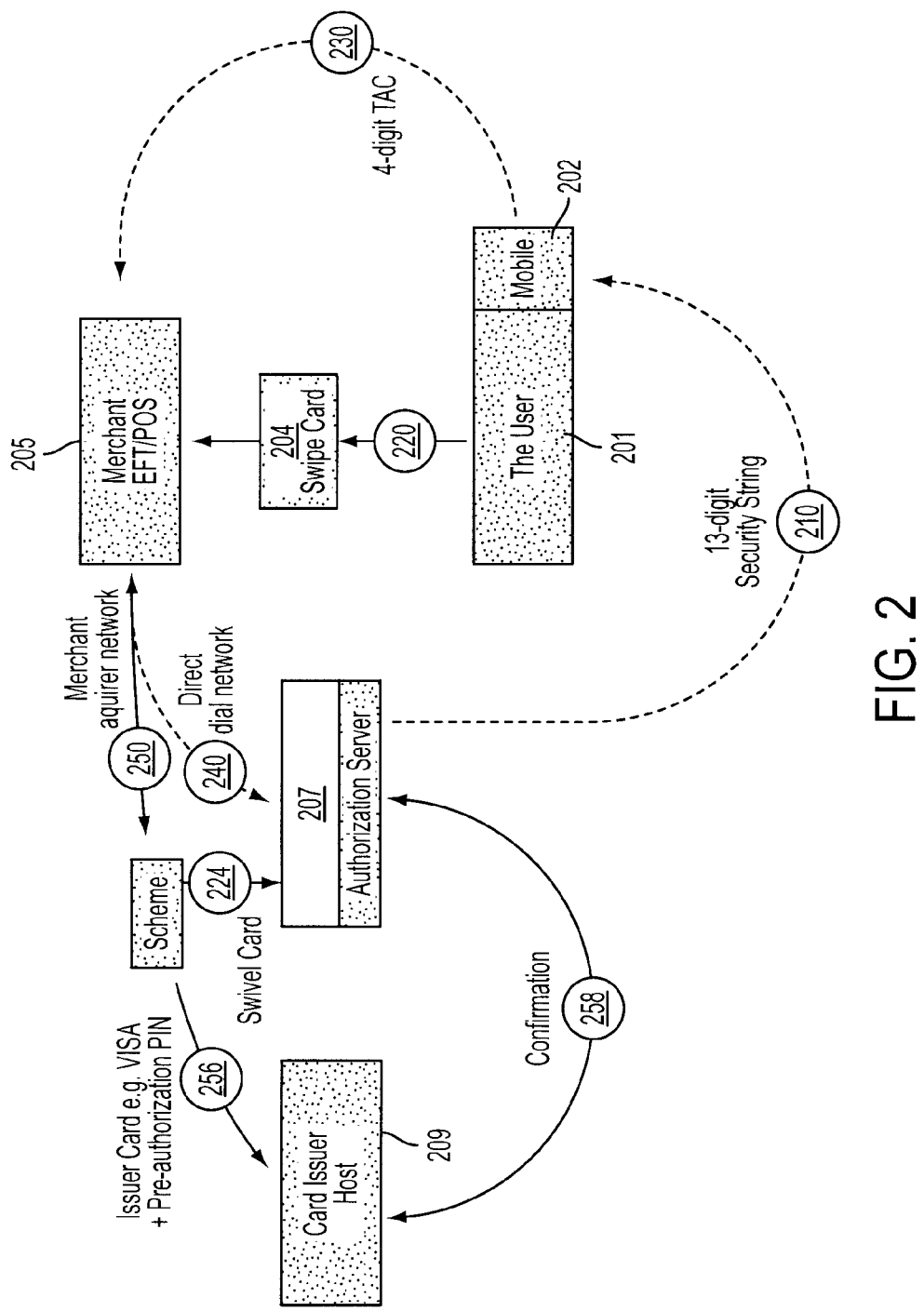
FIG. 2 is a schematic diagram showing a preferred embodiment of the dual channel schema.

FIG. 2 represents a diagram showing the protocol for the present invention applied to a point of sale environment. FIG. 2 displays the main components and steps for this transaction and displays two different options. The first option utilizes a split dial electronic funds transfer point of sale machine (EFT/POS), where the details of the transaction are directly sent via the Authorization Server 207. The second option utilizes the merchant acquirer's network.

In the direct dial scenario, the user 201 receives a security string 210 from the Authorization Server 207 which resides on the device 202. The security string 210 resides on the device 202, such as a mobile phone, until the user is ready to make a purchase. When the user 201 is ready to make a purchase they hand over, in step 220, their enabled credit card 204 to a merchant 205 to conduct the electronic funds transfer or point of sale (EFT/POS). The card 204 is swiped as usual at the merchant's 205 EFT/POS terminal. The user 201 reviews the security string 210 residing on their device 202 and determines their TAC for that particular sale. The four digit TAC 230 is provided to the merchant 205 by the user 201. The user 201 may provide the TAC verbally, by entering it into the POS terminal, or by entering the number on the mobile device 202. The credit card 204, TAC 230, and transaction amount are then sent, via the direct dial network 240, to the Authorization Server 207. The Authorization Server 207 confirms with the card issuer 209 via path 258 that the account has sufficient funds in the account and that the TAC corelates with the user's PIN number and the issued security string 210. In the event that the account number, transaction amount, and TAC are verified the Authorization Server 207 allows the transaction to proceed.

In the second scenario, referred to as the merchant acquirer network scenario, the same initial steps apply. The user 201 receives a security string 210 which resides on the device 202, such as a mobile phone, and that when the user 201 is ready to purchase an item from the merchant 205 they, in step 220, present the merchant 205 with the registered credit or debit card 204. The card 204 is swiped at the EFT/POS terminal and again the user 201 determines their four digit TAC 230, via the security string 210 residing on their mobile phone or device 202. In this scenario, the transaction information including the account number of the card 204 and amount of purchase are routed via path 250 to scheme 252. The standard credit card transaction details and the pre-authorized PIN are sent to the card issuing host server 209. The scheme 252 sends the card 204 information and pre-authorization PIN to the card issuer host 209 via communications path 256. Path 224 allows the scheme 252 to communicate with the Authorization Server 207 and verify that the pre-authorized PIN correlates to the user's PIN. The card issuer 209 proceeds with the transaction and upon verification allows the transaction to proceed.

In addition to the dual channel schema described above, the present invention also allows for a single channel schema whereby a user would be able to use the present invention for such transactions as online purchasing via internet websites. The single channel schema and protocol is conducted via either a computer, a Wireless Access Protocol ("WAP") device, Smart Card, Proprietary System or a third generation ("G3") mobile phone, where the security string is received and the TAC transmitted on the same device. This protocol does not require a secondary channel to conduct a secure transaction.

The single channel protocol runs via an applet downloaded by the user onto their computer, WAP device or G3 mobile phone. The security string and the TAC can only be received by an enabled server and transmitted via an a secure sockets layer ("SSL") link. The present invention is resistant to 'ghost' sites, where the user is unaware that the site they are dealing with is not certified, because the merchant (whether certified or not) would only be in possession of the users 'User name or card ID' and not the relevant TAC.

The single channel solution solves the problem encountered by transmitting the relevant TAC and security string over the Internet by instructing the user's Web browser to transmit only the user name to the merchant and the relevant TAC to the enabled server/database.

Figure 3:
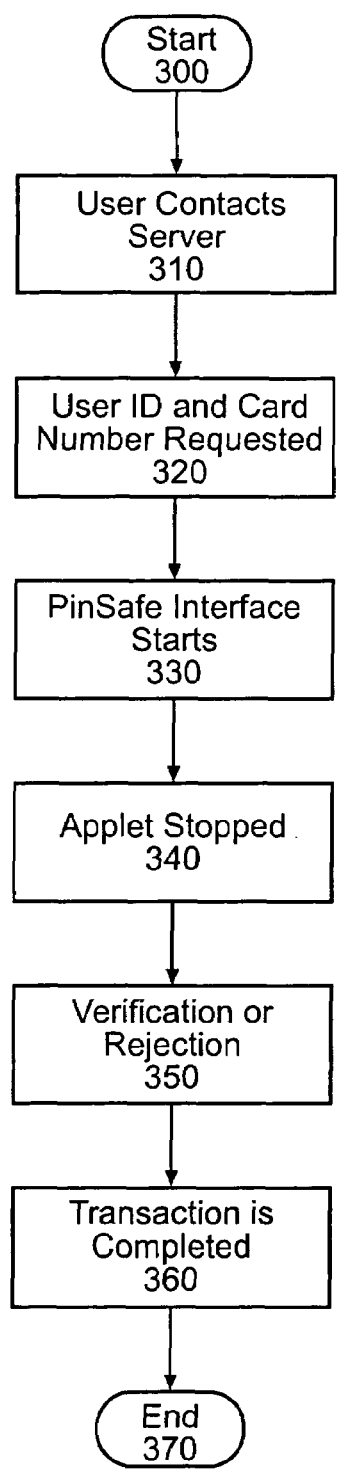
FIG. 3 is a process flow diagram showing the steps a user would take while interacting with the system of the present invention.

FIG. 3 shows each step along the process a user would take to register and use the single channel schema. The process is started in step 300 and in step 310 the user contacts the server host of the present invention through a single channel device such as a personal computer, an internet connected hand held device, a cell phone or wireless phone, or any device that may support a web browser via a single communication channel. Upon contact with the server or host of the present invention a log on web page containing the interface applet is sent to the user's device. In step two 320 the user is requested to input their user ID and preauthorized credit card or debit card number through an appropriate entry method. The user interface may include on screen drop down menus or other various user friendly applications to enhance the entry process of the user ID and credit card or debit card number. The user ID is sent to the server for verification. If the server verifies the user's identity a security string is sent to the client web page using the low processing overhead protocol (LPO protocol) with a prompt to initiate the applet. The applet is used to abstract and repack the TAC code according to the LPO protocol and start the Pin Safe interface.

In step 330 the Pin Safe interface is started enabling safe user entry of a PIN or TAC. The LPO protocol extraction is carried out using an automatic System Identification Digit (SID) and System Outgoing Digit (SOD) generation. As will be described in more detail below, the TAC code is pulled from the security string and repacked according to the LPO protocol and sent to the server host for verification. In step 340 the applet is stopped and destroyed, all values are zeroed and the security string residing on the device is cleared. The user sees an interface which identifies that the device is awaiting a response from the server. In step 350 the log on to the server is verified or rejected according to the user ID and TAC code response. If verified, confirmation is sent to the client browser followed by requested service access or transaction. In step 360 the session or transaction is finished allowing the user to close the session or the process or the session may be automatically closed triggered by some length of time of inactivity. The user's information with the single channel schema is terminated at step 370.

Figure 4:
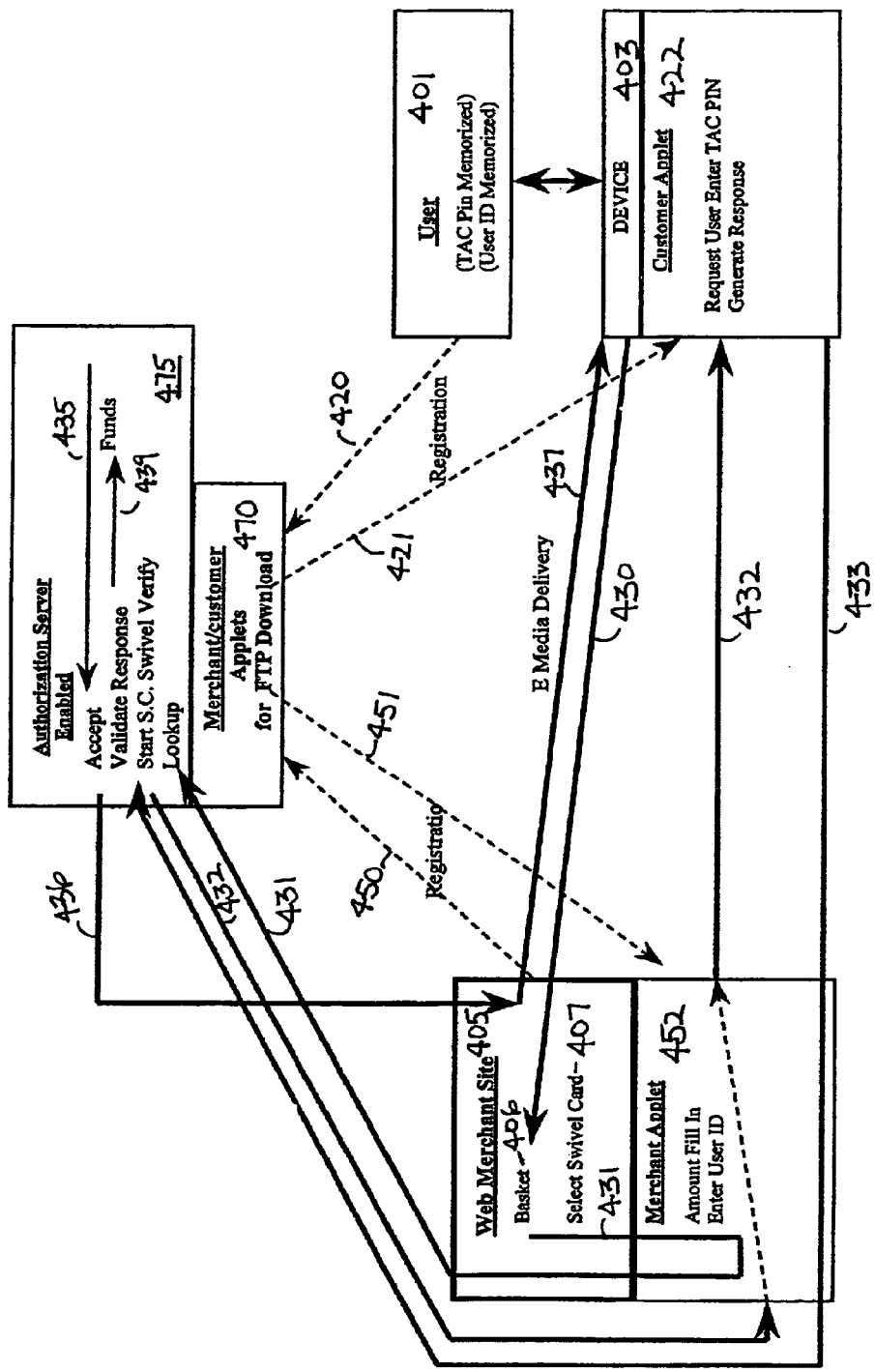
FIG. 4 is a schematic diagram showing a preferred embodiment of the single channel schema of the present invention.

FIG. 4 displays the main components for a preferred embodiment of the single channel schema of the present invention. The user 401 would visit the server 407 of the present invention and the server 407 would provide applets 470 for downloading to the user's device 403 via path 420. The user 401 downloads an applet 470 via path 421 which is then stored on the device 403 as the customer applet 422. The web merchant 405 would also visit the Authorization Server 475 via path 450 and download an applet 470 via path 451 which is stored on the merchant site 405 as merchant applet 452. The user 401 using the device 403 visits the web merchant site 405 via path 430 and selects items they wish to purchase by placing them in the basket 406 and selecting the appropriate credit or debit card for use 407. The merchant site 405 then accumulates the items in the basket 406, information about the card 407, and utilizing the merchant applet 452 routes the information along path 431 to the Authorization Server 407.

The Authorization Server 407 starts the verification process and using communications path 432 routes the appropriate information back through the merchant applet 452 to the customer applet 422 resident on the user's device 403. The user 401 is requested to enter the TAC. Once the user has entered the TAC, the TAC is sent along path 433 through the merchant back to the Authorization Server 407 to validate the response. In addition, the Authorization Server 407, at step 434, validates that there are sufficient funds in the account and in step 435 verifies that the information about the card 407, TAC, and account funds availability are verified. The Authorization Server 407 sends an "accept" notice along path 436 to the merchant site 405 which is then relayed, via path 437, to the users device 403.

Figure 5:
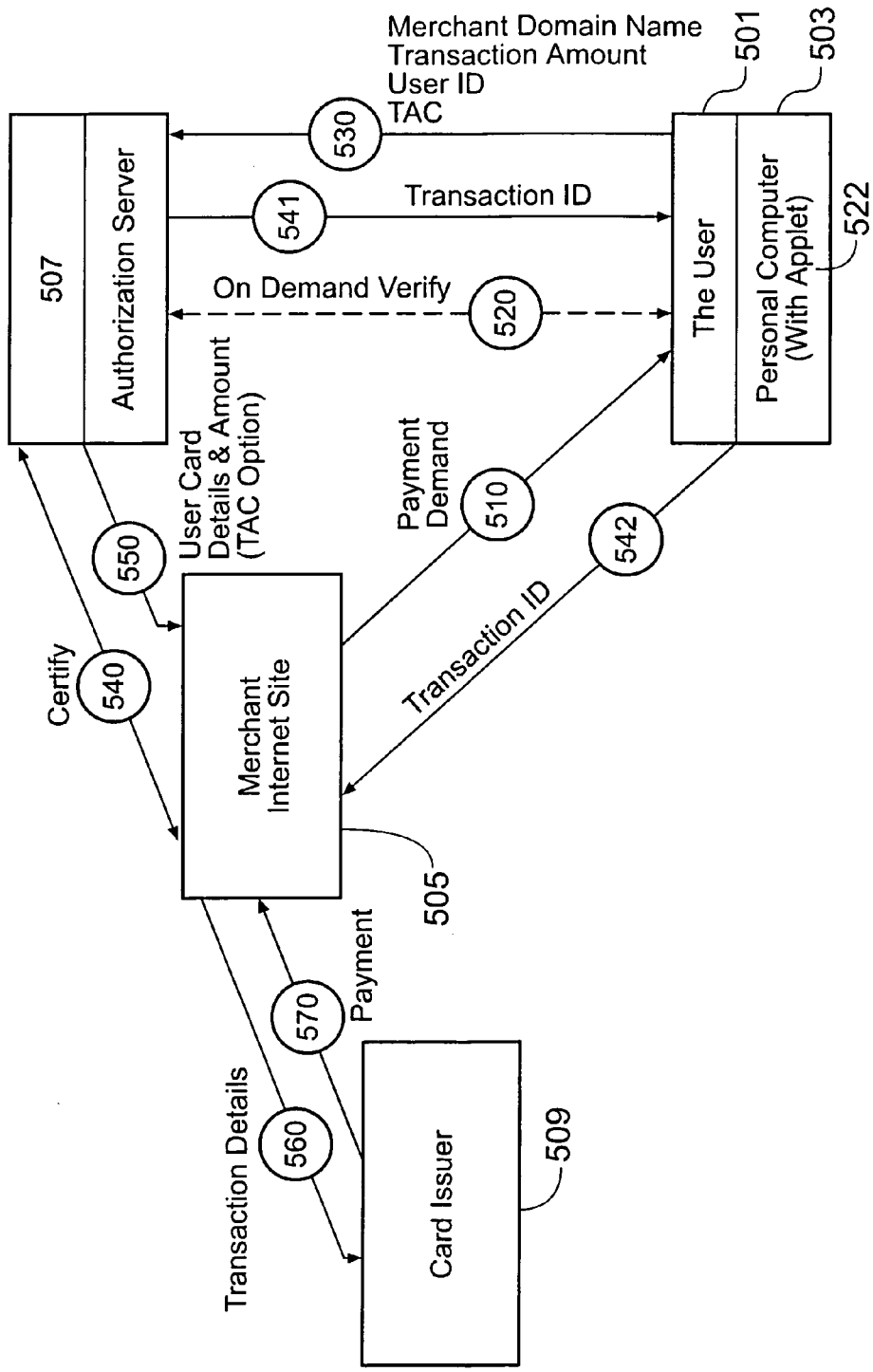
FIG. 5 is a schematic diagram showing an additional embodiment of the single channel schema of the present invention.
Figure 6:
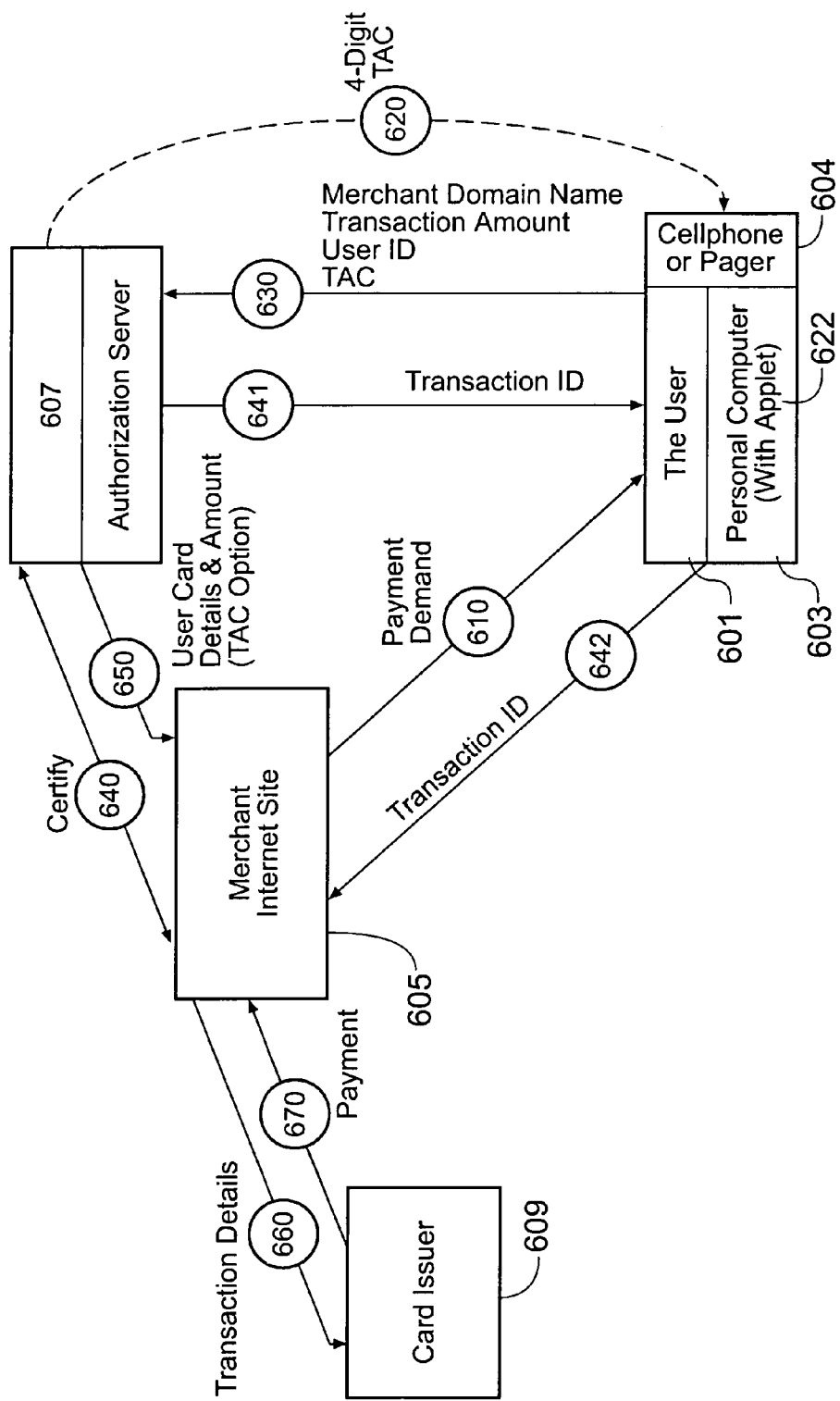
FIG. 6 is a schematic diagram of an additional embodiment of the single channel schema of the present invention.
Figure 7:
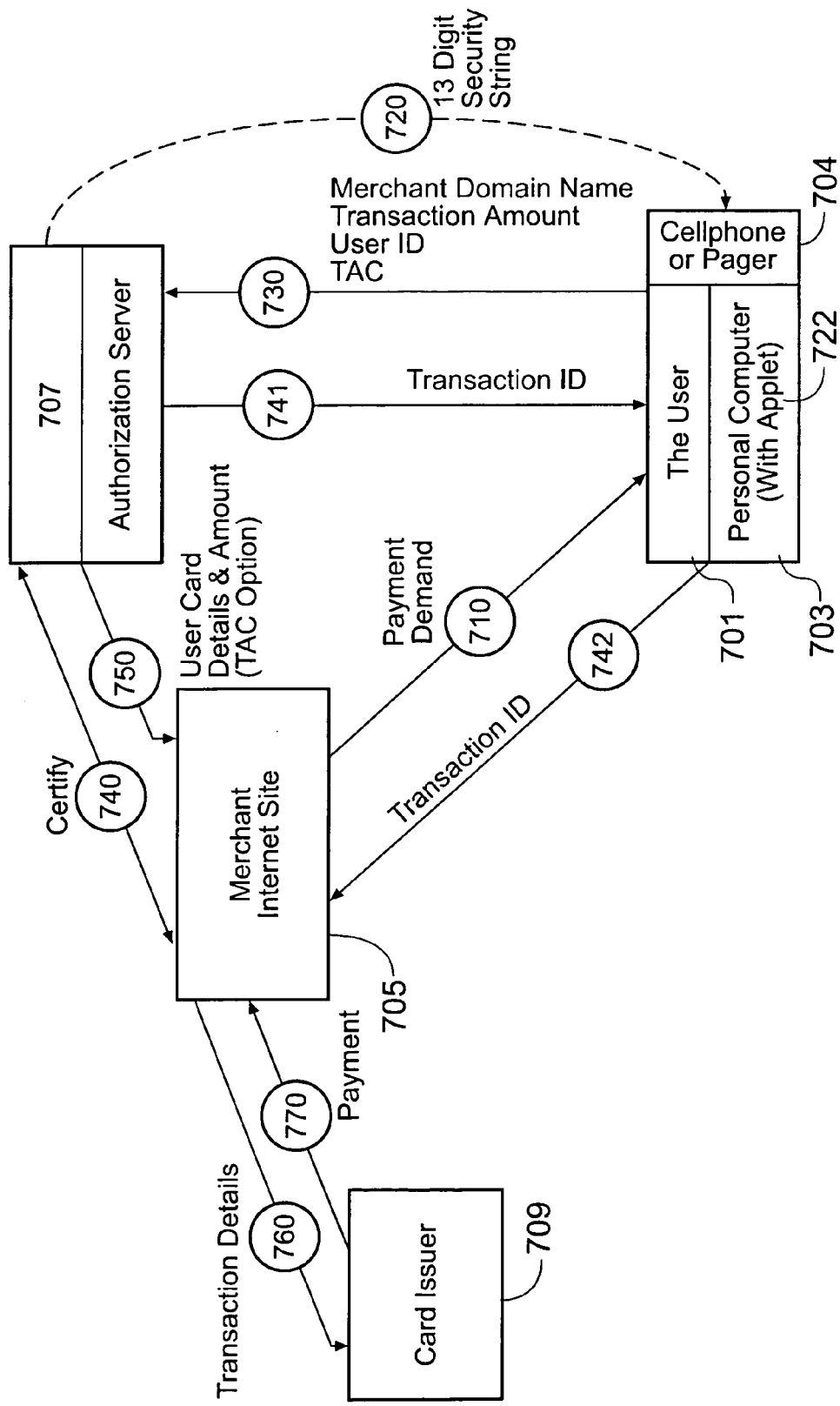
FIG. 7 is a schematic diagram of an additional embodiment of the single channel schema of the present invention.

FIGS. 5-7 also relate to single channel schemas utilizing different aspects and security protocols. In FIG. 5, the user 501 visits a merchant internet site 505 and would select various items for purchase. Upon checkout, payment is demanded via path 510 from the merchant site 505 to the user 501. The personal computer or device 503 contains an applet 522 which communicates with the site 505 and includes the proper software or applet 522 to notify, along path 520, the Authorization Server 507 that a transaction authorization is needed. The merchant domain name, transaction amount, user ID, and Transaction Authorization Code (TAC) are transferred from the user's device 503, along path 530, to the Authorization Server 507. Already present on the personal computer or user's device 503 is the security string for the user to determine their TAC code.

The Authorization Server 507 communicates with the merchant internet site 505, via path 540, to certify the card and transaction amount information. The Authorization Server 507 also forwards a transaction ID via path 541 to the user 501 through the user's personal computer 503. The transaction ID is forwarded to the merchant's internet site, along path 542, from the user's personal computer 503. The Authorization Server 507 certifies that the amount of purchase, the card information, and TAC are appropriate and sends the card details and amount along path 550 to the merchant internet site 505. The transaction details are sent from the merchant internet site 505 to the card issuer 509, via path 560, and ultimately the card issuer 509 sends payment via path 570 to the merchant internet site 505.

The single channel schema displayed in FIG. 6 is similar to the single channel schema displayed in FIG. 5 except that a wireless device 604 is included to remove the security string from the user's personal computer 603. In the schema illustrated in FIG. 6, the security string is omitted and simply the four digit TAC 620 for that transaction is transmitted from the Authorization Server 607 to the user's wireless device 604.

FIG. 7 is a single channel schema similar to the single channel schemas disclosed in FIGS. 5 and 6 except that instead of the four digit TAC being transmitted from the Authorization Server 707 to the wireless device 704, as described above in relation to FIG. 6, a thirteen digit security string 720 is sent to the wireless device 704. The schema disclosed in FIG. 7 discloses that as the user 701 selects items to be purchased from the merchant internet site 705 the payment demand along path 710 is sent to the user via the user's personal computer 703. The applet 722 then prompts the user to enter the TAC code, which the user determines from the security string 720 sent from the Authorization Server 707 to the wireless device 704. The applet 722 forwards the merchant domain name, transaction amount, user ID, and TAC to the Authorization Server 707 along path 730. The Authorization Server 707 certifies the transaction, along path 740, and forwards the user account number and amount along path 750 to the merchant internet site 705. The transaction details are sent from the merchant internet site 705 to the card issuer 709, along path 760, and payment is then forwarded from the card issuer 709 to the merchant internet site 705 along path 770.

In the various online merchant scenarios employing the single or dual channel schema, as seen in FIGS. 2-7, there may be instances when the merchant does not have a particular item in stock and therefore can not process or complete the entire transaction immediately. In these instances, the merchant typically does not complete the transaction until the merchandise is dispatched. However, the user may have already input their TAC and the system would want to send the user a new pseudo-random security string.

The present invention overcomes this hurdle by having the Authorization Server receive the payment request and the active TAC. The merchant's server typically would transmit the order request to the authorization server within a nominal 1-minute time out. However, if the merchant has received a purchase order for goods not in stock that order request will be delayed. The delayed order request will not be sent to the authorization server until the goods have been received and are ready to be dispatched to the customer. Upon reception of the user's TAC and transaction details and the absence of the merchant's transmission of the order within the 1-minute timeframe the authorization server will default to a deferred payment program.

The deferred payment program will hold the active TAC at the Authorization Server and is proof that the user has ordered the goods. A new security string can then be issued to the user for use during the next transaction. The authorization server program will immediately send an email to the user stating details of the goods that he has requested from the merchant. Every week, or some other predetermined time interval, the Authorization Server will remind the user of his order request. The user is therefore informed of any pending transactions that will be eventually cleared through his account.

When the goods arrive at the merchant's depot and are ready to dispatch, the merchant details are then transmitted to the Authorization Server and the transaction is completed. If by this time the user has insufficient funds to cover the transaction amount the transaction would be declined, as typical in a standard credit card transaction.

Figure 8:
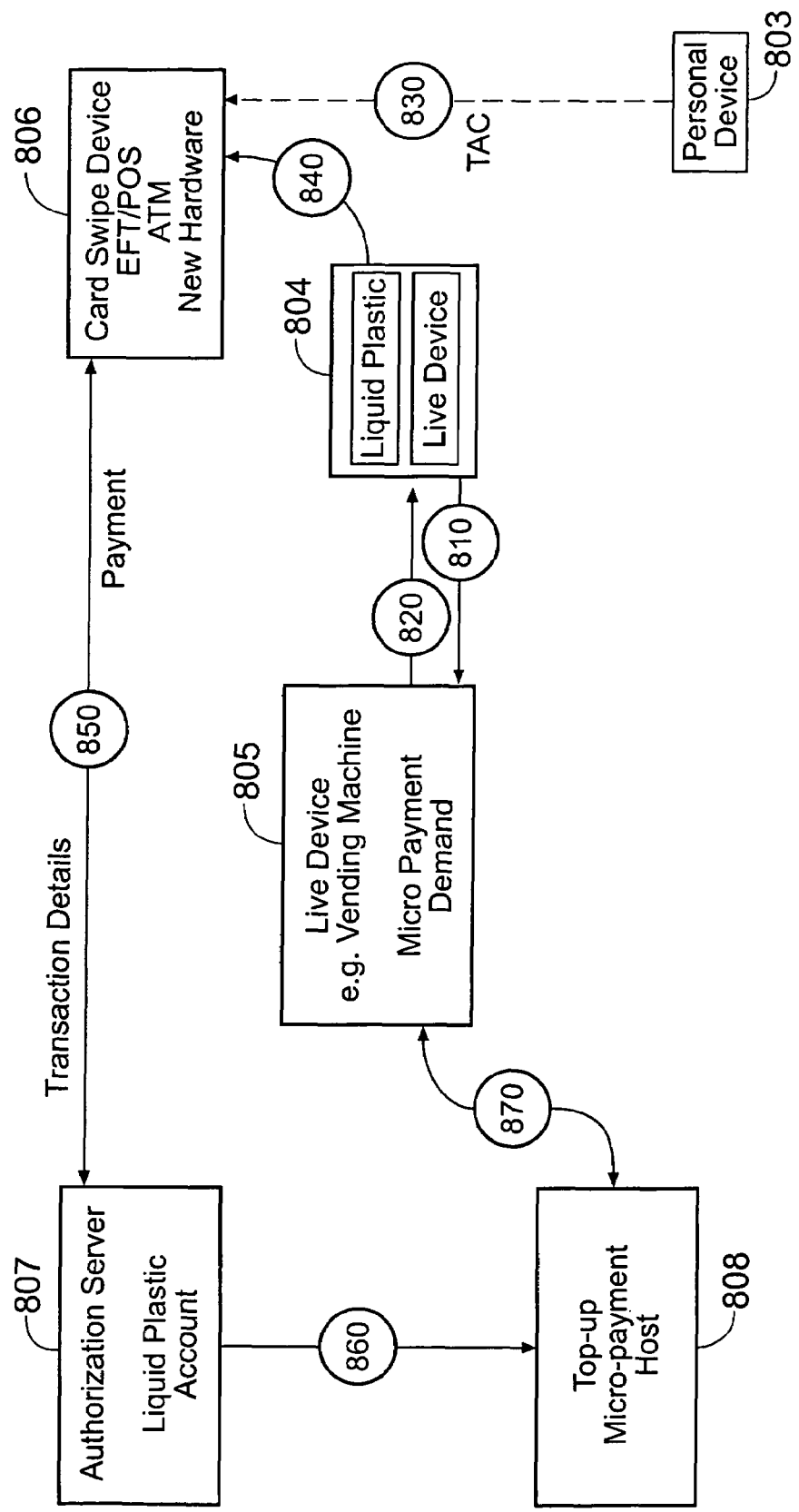
FIG. 8 is a schematic diagram showing an additional embodiment incorporating various aspects and features of the present invention.

FIG. 8 represents an additional schema utilizing features of the present invention in which a user has a pre-authorized or debit account 804. The user would see a live device 805, such as a vending machine, and would select items via path 820 thereby triggering the live device 805 to demand payment via path 810. The payment demand would be routed through the preauthorized liquid account 804 which is done by swiping the pre-authorized account 804, such as a credit or debit card, in step 840 through a card swipe device 806. In addition the micro payment demand would also notify the card swipe device 806 that a TAC would be requested. The user may have a personal device 803, such as a wireless phone, which would contain either a TAC or security string whereby the user would determine the TAC and enter the TAC 830 into the card swipe device 806. Alternatively, the user could enter the TAC 830 into the wireless device 803 which would wirelessly transmit the TAC 830 to the card swipe device 806 or Authorization Server 807. The details of the transaction are sent along path 850 from the card swipe device 806 to the Authorization Server 807. The Authorization Server 807 contains the information on the liquid account and if verified would notify a micro payment host 808 along path 860 to authorize payment. The micro payment host 808 then transfers payment along path 870 to the live device 805.

Figure 9:
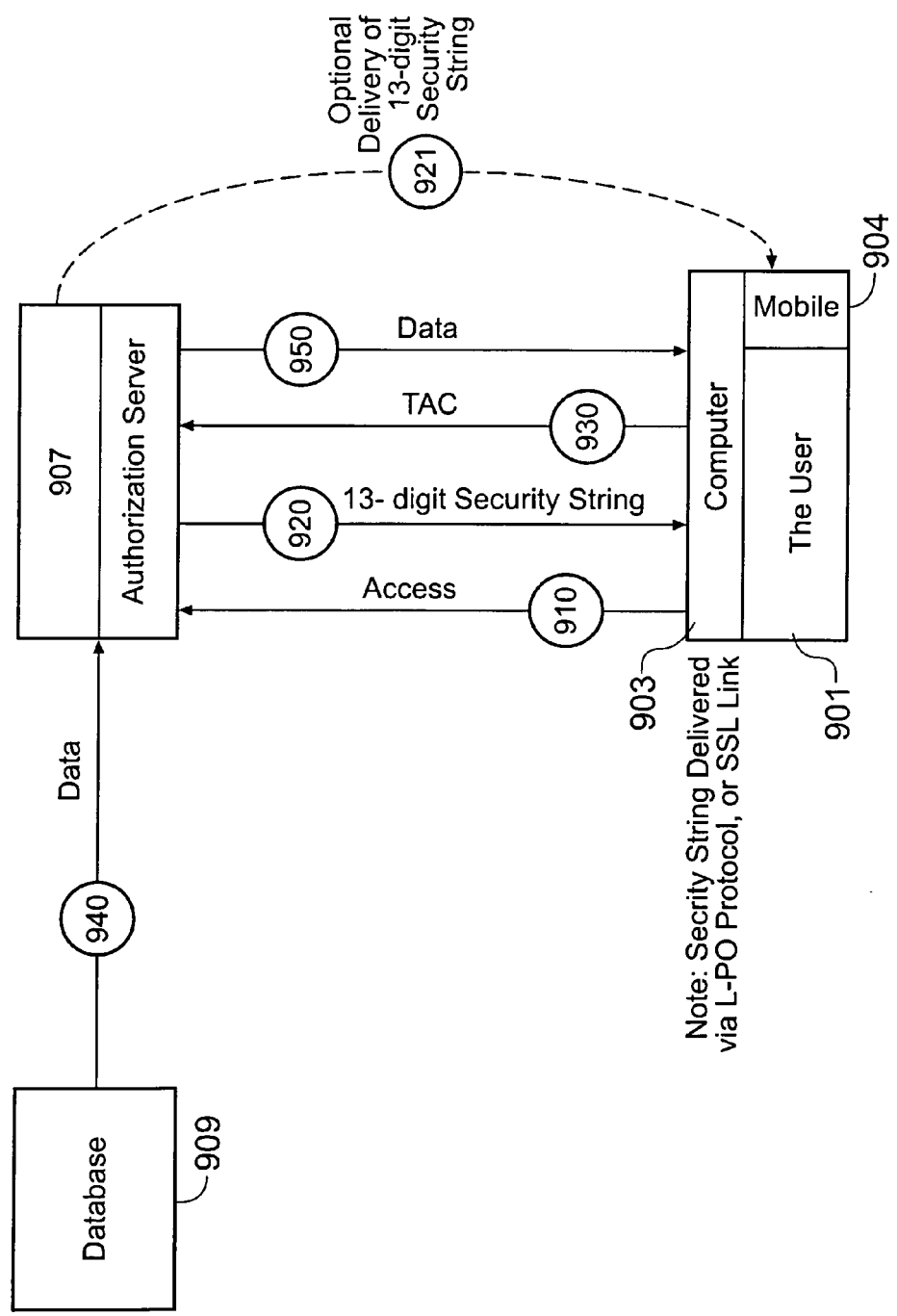
FIG. 9 is a schematic diagram showing a secured database access system of the present invention.

FIG. 9 represents a data control schema whereby elements of the present invention can be used to add a security overlay and pre-authorization into a database for controlling access to a database. In FIG. 9 the user 901 through their computer or laptop 903 wants access to a database 909. Access is requested along path 910 from the Authorization Server 907. A security string is sent from the Authorization Server 907 to the computer 903, via path 920, whereby the user determines their TAC. The user inputs the TAC which is transmitted to the Authorization Server 907 along path 930. Provided the TAC matches the appropriate PIN verified for the user 901 the Authorization Server 907 allows access to the database 909 along path 940. Further, the system can simply transmit the TAC, instead of the security string. The access data is then transmitted to the user's computer 903 through the Authorization Server 907 via path 950. In addition, the security string can be sent to the user 901 via an alternate path 921 such as through use of a wireless device 904.

Figure 10:
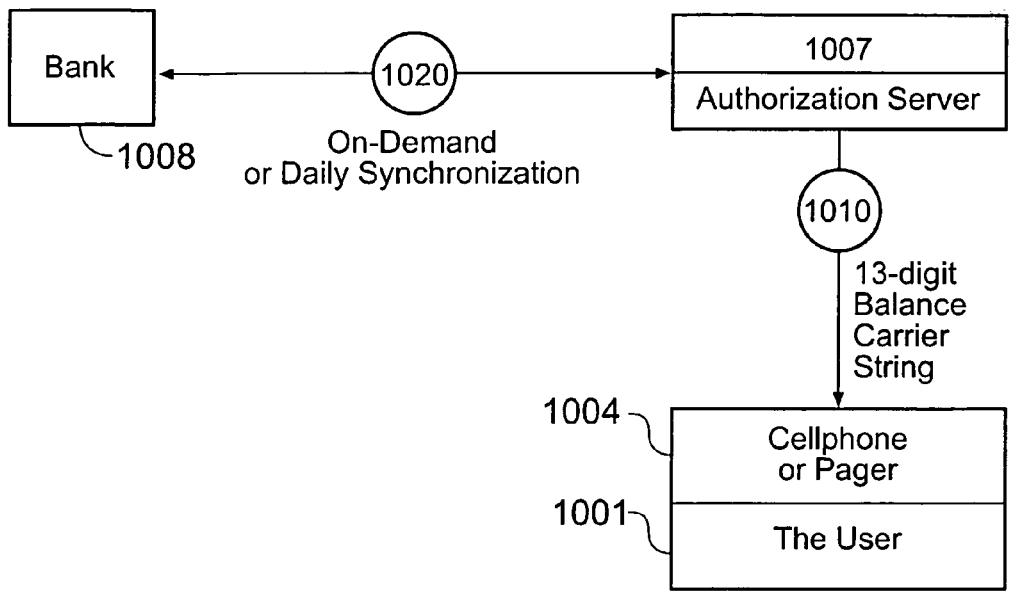
FIG. 10 is a schematic diagram of a secure system for retrieving bank account information.

FIG. 10 represents a remote bank balance inquiry schema whereby a user can check the balance of an account. In the schema presented in FIG. 10, the user 1001 through use of a cell phone, pager, or wireless device 1004 can request the balance of an account located in a bank 1008. The user is provided with a security string or TAC, via path 1010, which is resident on the wireless device 1004. The user determines their TAC code and either presents their TAC code through a bank teller (not shown) or inputs it into the wireless device 1004. The TAC code is sent to the Authorization Server 1007 which verifies that the TAC code is appropriate for the security string and corresponds with the user's PIN. The Authorization Server 1007 then communicates with the bank 1008 along path 1020 to retrieve the account information thereby providing the user with the requested information.

Two important aspects of the present invention which are utilized in the dual and single channel schemas described in relation to FIGS. 2-10 are the low processing overhead protocol and the security string operation. Certain wireless devices, such as web devices, cannot run high level encrypted programs due to their low processing overhead. The present invention incorporates a low processing overhead protocol which enables such devices to run highly secured transactions or downloads without using a large memory foot print. An additional benefit of the low processing overhead protocol is that existing transaction data issuing servers could also process information quicker than traditionally encrypted systems. The low processing overhead protocol evades the possibility of a correlation between the TAC and security string by simultaneously using multiple security strings. Only one of the multiple security strings is actually relevant and the remaining strings are used to hide the relevant string. The security strings contain identical digits but are arranged in different random orders. The user's applet receives the multiple security strings and distinguishes which string is relevant by using a system identifying digit (SID). The system identifying digit knows which of the security strings is genuine and instantly dumps the irrelevant strings and processes only the correct and relevant string. As an example, if the identifying digit value was 4, the present invention would identify that the fourth security string was the relevant security string.

Figure 11:
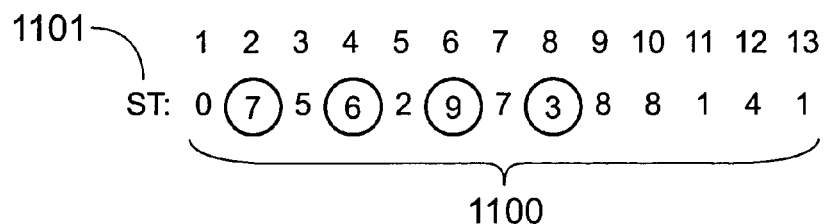
FIG. 11 is a representation of pseudo-random string.

During a transaction, as will be described in conjunction with FIGS. 11 and 12, the user inputs their PIN and the TAC is internally calculated on the applet of the wireless device, personal computer EFT/POS, or as seen in FIG. 11, a thirteen digit security string 1100 would be sent from the Authorization Server to the user; device identifying a string of random digits, in this instance thirteen (13). The security string 1100 may come with a two letter identifying prefix 1101 which identifies which server has issued the security string 1100. For example in FIG. 11, if the user's PIN was 2468 and the user applies that PIN number to the digit locations in the security string 1100. The user would look at the number in the second spot, the fourth spot, the sixth spot and the eighth spot to determine their transaction affirmation code or TAC for that particular transaction. In this instance, the user's PIN of 2468 would yield a TAC of 7693. Therefore, the user would input 7693 as the TAC to notify the Authorization Server to continue with the verification process.

Figure 12:
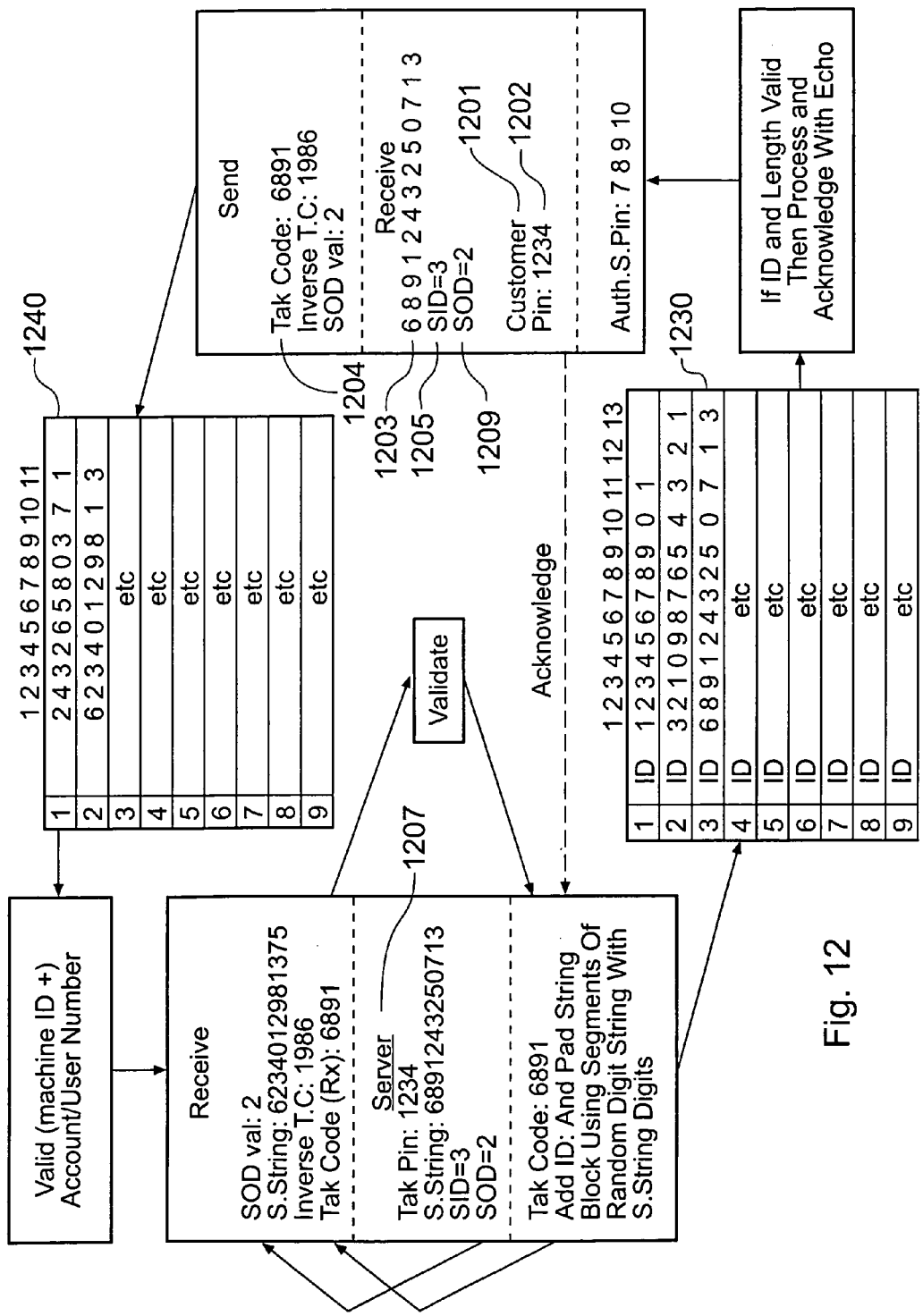
FIG. 12 is a schematic diagram showing the modification and integration process of the user's temporary or transactional.
Figure 13B:
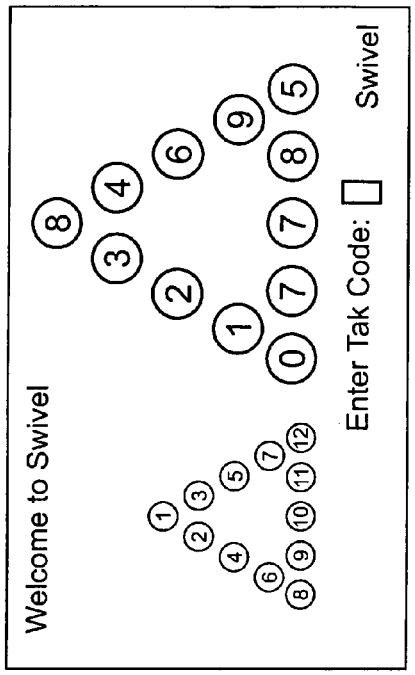
FIG. 13b is a graphical representation of the user interface of the present invention.
Figure 13D:
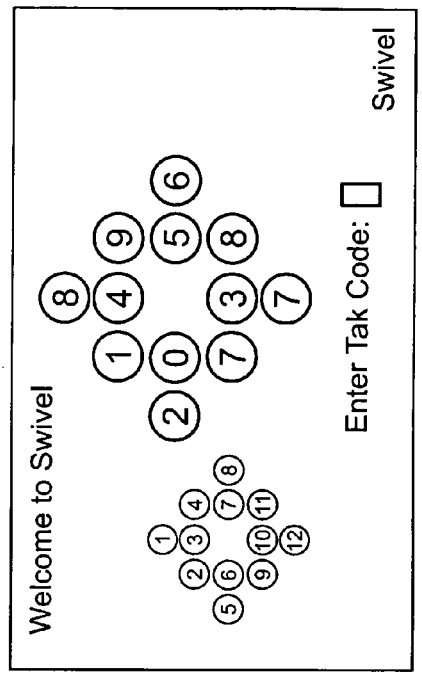
FIG. 13d is a graphical representation of the user interface of the present invention.
Figure 13A:
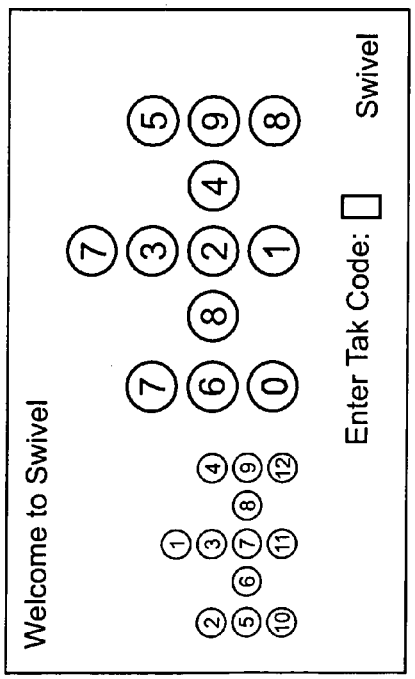
FIG. 13a is a graphical representation of the user interface of the present invention.
Figure 13C:
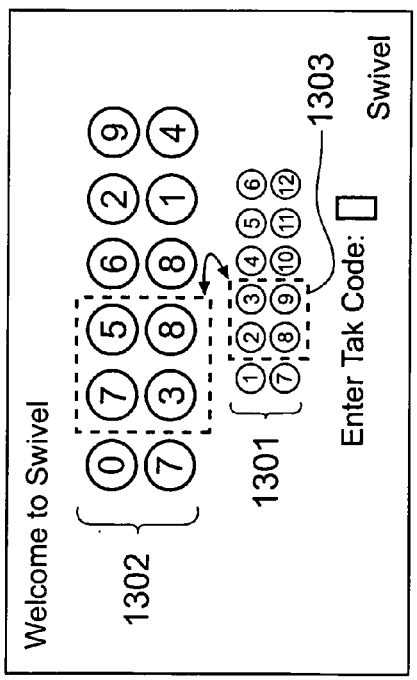
FIG. 13c is a graphical representation of the user interface of the present invention.
Figure 13F:
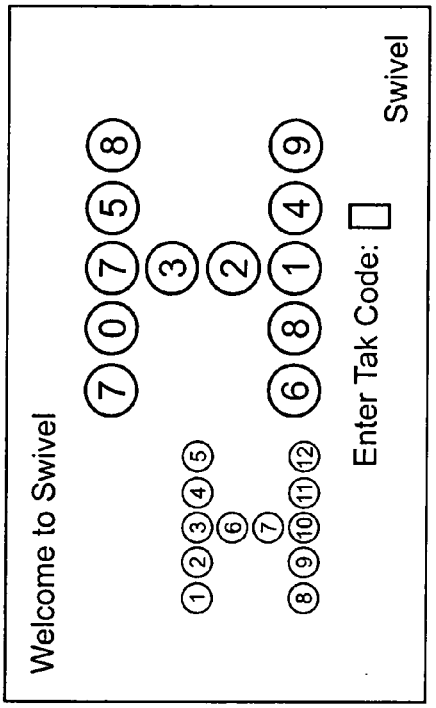
FIG. 13f is a graphical representation of the user interface of the present invention.
Figure 13H:
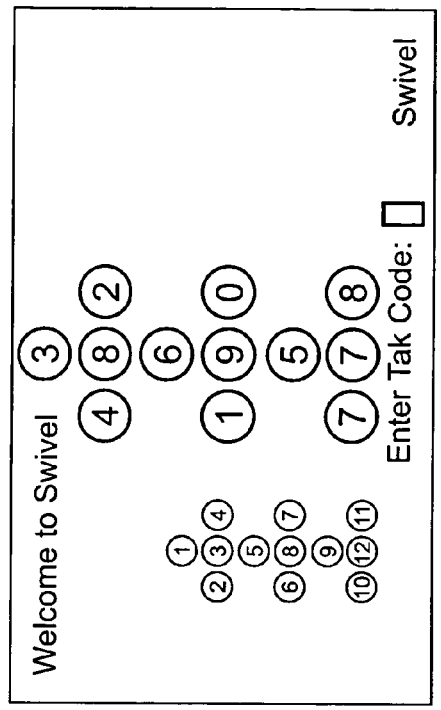
FIG. 13h is a graphical representation of the user interface of the present invention.
Figure 13E:
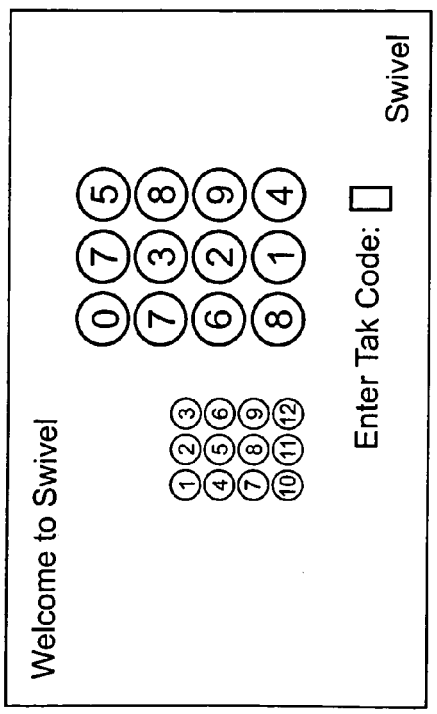
FIG. 13e is a graphical representation of the user interface of the present invention.
Figure 13G:
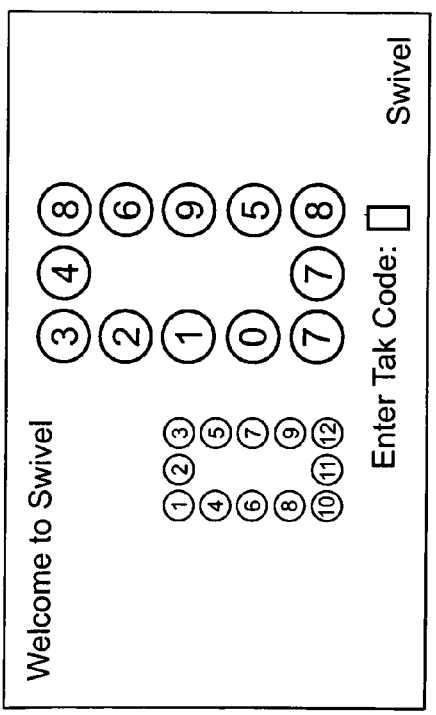
FIG. 13g is a graphical representation of the user interface of the present invention.
Figure 14:
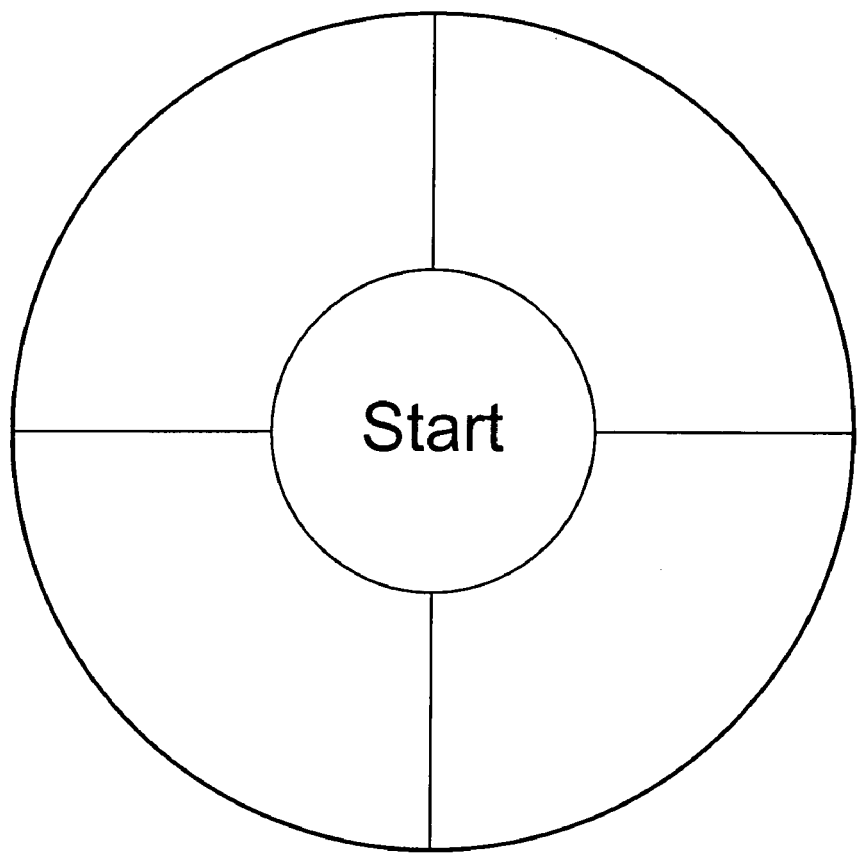
FIG. 14 is a graphical representation of the start screen of the PIN Safe interface of the present invention.

Further explanation of the manner in which the TAC is secured within the transmitted secure security strings is explained in conjunction with FIG. 12. As seen in FIG. 12, the user, or customer 1201 has a known PIN 1202 (i.e. 1234). Stored on the user's device and downloaded from the server 1207 is the thirteen digit pseudorandom string 1203. In this instance, the customer's PIN value of 1234 as it relates to the pseudo string 1203 indicates a TAC code 1204 of '6891.' When the user is asked to verify or input the TAC 1204 to authorize the server 1207 to verify that the customer 1201 is in fact the authorized and registered customer the TAC 1204 may be manipulated and reversed in a myriad of ways to protect the code during transfer along the communications path to the server 1207. One method for providing a security overlay to the customer's PIN 1202 and the TAC code 1204 is to incorporate the TAC code into one thirteen digit string of a multitude of strings as previously described.

To identify the appropriate string the applet running on the customer's device would identify the relevant string through a system identifying digit 1205. The SID 1205 is used to identify which of the security strings is relevant. The SID 1205 may be determined in a myriad of ways including using certain numbers or combination of numbers of the user's PIN 1202, having the user set the SID 1205, and having the system server set the SID 1205. In the example shown in FIG. 12, the system set the SID value equal to 3. Therefore, the third string of nine strings is the relevant string. The nine (9) strings of thirteen (13) digits are sent via a data connect, such as a data stream 1230, to the user or customer's 1201 device. The applet on the device knows the SID 1205 value and extracts the relevant string 1203.

The customer reviews the relevant string 1203 resident on their device and determines their TAC 1204. The TAC 1204 is then intertwined into an outgoing relevant string which is grouped with eight (8) non-relevant strings. The outgoing data stream 1240 contains nine outgoing strings of thirteen digits. The location of the relative outgoing string is identified by a system outgoing digit (SOD) 1209 which can also be determined in a myriad of ways such as using or adding certain numbers of a customer's PIN 1202 or having the customer or system server select the SOD 1209.

In this example, the system set the system outgoing digit (SOD) 1209 value at 2. Therefore, the TAC 1204 will be integrated into the second of nine strings in the data stream of strings 1240. The TAC code 1204 may also be inversed, manipulated, have an automatic number added to it (i.e. each number is increased by one), or any other manner in which the PIN number can be modified prior to transmission. In the example shown in FIG. 12, the TAC code 1204, is inversed to determine the location of the TAC numbers within the relevant outgoing string. For example, since the TAC 1204 in this example had a value of '6891' the inverse value of '1986' would dictate that in the first spot is the first digit of the TAC code, in the ninth spot is the second digit of the TAC and so forth until the TAC is integrated into the relevant security string.

The data stream of outgoing security strings 1240 containing the nine strings of thirteen digits is sent to the server 1207 which has an applet for verification. The server 1207 has an applet which knows the SOD 1209 value and can identify the relevant outgoing security string for verification of the user's PIN. Therefore, the applet on server the server 1207 knows the customer's PIN 1202 is '1234' and can determine that based upon the protocol established can determine that the SOD 1209 value was 2 and therefore the relevant string is the second string. The server 1207 will analyze the second string in relation to the user's stored PIN and expected response to verify that the response matches the TAC 1204 code from the initial string 1230.

Upon receiving the nine carrier strings, the server 1207 knows the outgoing digit position of the relevant TAC carrier string and instantly dumps the irrelevant strings and processes the correct selected TAC carrying string. The verification process at the server 1207 then matches the correct TAC with the issued security string and user's PIN number. If all three correlate, the authorization is completed and a new security string is transmitted to the user's applet.

Although in this example the number has been limited to nine lines of thirteen digits plus three (3) system digits per line (totaling 144 digits). It is not meant to limit the number of lines or digits that can be used. The nine lines of thirteen digits totaling 144 digits is intentionally less than the total global packet standard for many devices of 160 characters. Therefore, keeping the digit size below 160 keeps the processing overhead at a minimum allowing for low processing capability in WAP applications and wireless devices. In addition, this low processing overhead results in extremely fast verification times. The verification process also employs a filtering step followed by a single dimension array process which is not an intensive arithmetic computation system which would require more processing time.

In addition to the various single and dual channel schemas, the low processing overhead protocol, and use of the multiple security string security overlay the present invention may also provide a security overlay within the user interface. FIGS. 13a-13h represent various user interface examples to which a user may be provided for inputting a user's TAC. In the examples provided in 13a-13h the user would remember their personal PIN as a pattern rather than a numerical sequence. As an example, if the user had chosen to use the shape 1301 and shown display in FIG. 13e, they would only have to remember that they created a PIN which creates a small box 1303 inside of the shape 1301 disclosed in FIG. 13c. When the display is populated with random numbers then user applies their chosen design (i.e. small box 1303). In this example, the user's PIN from box 1303 would be '2389'. Therefore, knowing the PIN of '2389' and viewing the randomly generated numbers within the random display 1302 the user would see that the numbers '7538' correspond with their PIN number location. Therefore, the user's TAC for completing such a transaction or entry into the database, would be '7538'. The user interfaces disclosed in FIGS. 13a-h are merely exemplary and numerous displays, as well as colors and graphic symbols could be incorporated into the user interface. Therefore, the user would be able to create a graphic representation of their PIN without the need to remember the four digit PIN number.

Another feature of the present invention which deals with the user interface of the system involves the use of a Pin Safe deterrent interface. Any device with a keyboard or touch sensitive interface which may be connected to a network or which is otherwise capable of downloading data or machine code may have the integrity of a password or key entry security system comprised. One way in which the system may be comprised is through the use of a Trojan program. A Trojan program is a small program which collects keyboard information for latter use. An additional program can also collect password or key entry information but fanes an unsuccessful logon attempt at the last digit of the logon entry and attempts to continue the logon with the real user unaware, by guessing the last digit (this is known as a "sniffer" program). Both of these techniques require actual data from a device keyboard or key pad or other input device. Whereas data may, by encryption or other means, be delivered and resent securely right up to and from the actual process occurring in the devices processing unit, if the security system requires meaningful user data entry to access or operate the security system that data may be intercepted and relayed greatly reducing the security of the system.

Although keyboard or small amounts of other input data may be redirected or stored with little or no user indication or system performance impact the same cannot be said for the device's graphical display, where the output is high throughput and device specific. Screen grabbing, or screen capturing, is possible but system resource intensive and therefore quite likely to be discovered by a user, especially on a device of comparatively low processing power. A good level of resistance could therefore be offered by an interface that provides information to a security system that is only meaningful to that system within the scope of its own time interface parameters and where any captured keyboard information has no external meaning. Similarly, any possible screen grabbed or screen captured information should not compromise the system's logon security.

The inputting of a Username, Password or PIN number in a computer, portable digital assistant ("PDA"), 2.5G or 3G mobile device is currently flawed for the following reasons: (1) the User can be seen from onlookers entering their PIN number into the device (called 'shoulder surfing'); (2) the keyboard could contain a 'Trojan' program that records the inputted Username, Password or PIN number (Trojans are downloaded without the knowledge of the User onto a computer and can reside there indefinitely); (3) PKI Certificates authenticate that the transaction was conducted on a certified computer, but they do not effectively authenticate the User behind the computer; and (4) computers running Microsoft Windows have a problem because Windows remembers the Username, Password or PIN number which creates a situation where the device stores the I/D of the User within the computer.

The "radar" deterrent or Pin Safe user interface of the present invention achieves a positive user I/D because the user has to be present during every transaction. The Pin Safe user interface is Trojan resistant because any key can be used to input a PIN or TAC which renders any Trojan key intercept information useless, as does the displayed information on screen.

In addition, the user interface is shoulder surfing resistant because there is nothing that could be gleaned from looking either at the screen or the keyboard input, rendering shoulder surfing a pointless exercise. Further, the system is resistant to PIN interception when using the Dual and Single channel (Applet) protocol. The protocol of the present invention is unique because it transmits a volatile TAC every time a transaction is made. A successful attempt to intercept/decrypt this information could not result in the user's real PIN being compromised.

Another feature of the present invention is that it is a multi-platform system. The PIN Safe user interface works on a wide variety of computers and applications because of its low memory footprint and simple generic user interface. The protocol and system as a whole is non device-specific and can run on any device such as a public use computer. The system does not have to run on a trusted computer system where the program history is known. With no digital certificate required for the computer the User could conduct a transaction on any computer worldwide.

Further, the user interface is easy to use because the user need know nothing about the protocol, TAC's and Security Strings. The PIN Safe user would merely input their unchanging PIN via the Pin Safe user interface. Further, the Pin Safe user interface is "tempest" proof because the interface does not display the users PIN or TAC (Pseudo PIN) on screen, and therefore is not subject to Electro-magnetic emissions from the video display unit ("VDU") that could be the subject of surveillance via Tempest technologies. The strong protection gained by using the Pin Safe user interface of the present invention allows safe single PIN usage on a variety of accounts with differing security architectures which can be achieved by using a central PIN Authorization Server. Even if the security string resides on the device it is not a problem because the present invention does not require a digital certificate and therefore there is nothing in the memory of the computer that compromises the Users I/D if it falls into the wrong hands.

The Pin Safe user interface involves a unique method of inputting a PIN number into a computer, ATM, PDA, 2.5G or 3G Mobile Device. FIGS. 14 and 15*a*-15*e* are representative examples of the Pin Safe user interface screens. When a user wishes to conduct an online transaction, the Pin Safe applet will activate which will provide the "Start" user interface displayed in FIG. 14. Pressing any key on the user's computer screen TAC or PIN then activates the entry interface screen. The interface can be activated by using the keyboard, mouse, or a touch screen display.

As seen in FIGS. 15*a*-15*e*, the Pin Safe interface will now start to display (in this example in a clockwise manner) 12 digits in sequence (starting with 1 and ending in 12). During the display cycle, the User simply registers his PIN or TAC by pushing any key on their keyboard, mouse or any spot on the touch screen display when the digit they wish to register is illuminated. The Pin Safe display will rotate 4 times, once for every digit of a 4 PIN number.

At the $12^{th}$ position there is a dwell time to allow customer response for the starting of the next cycle accurately. When the first cycle for the first PIN number has finished the display will start again with another cycle. The cycles can also be identified by changing the illumination color. This process is repeated 4 times until all 4 digits are inputted to make up the User's 4 digit PIN.

Figure 15A:
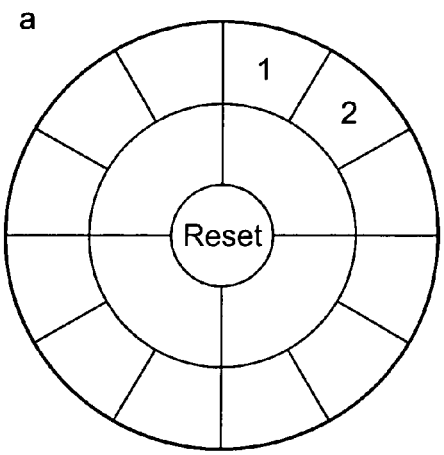
FIG. 15a is a graphical representation of the first cycle of the PIN Safe user interface.
Figure 15B:
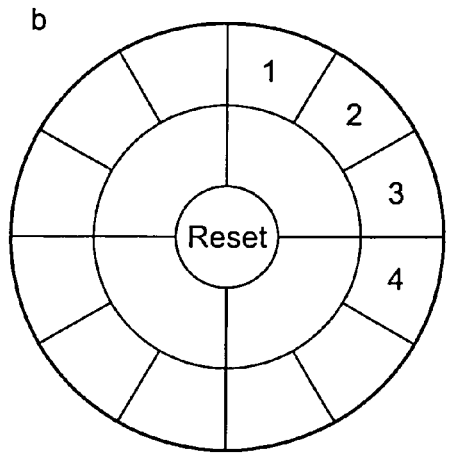
FIG. 15b is a graphical representation of the second cycle of the PIN Safe user interface.
Figure 15C:
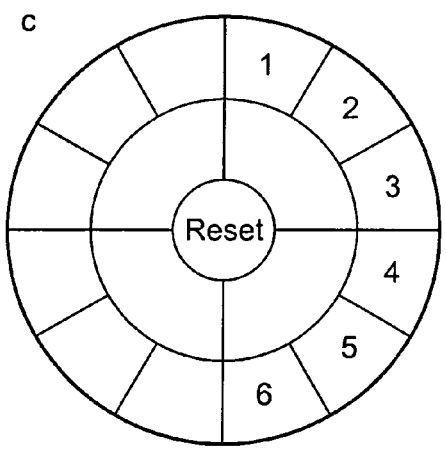
FIG. 15c is a graphical representation of the third cycle of the PIN Safe user interface.
Figure 15D:
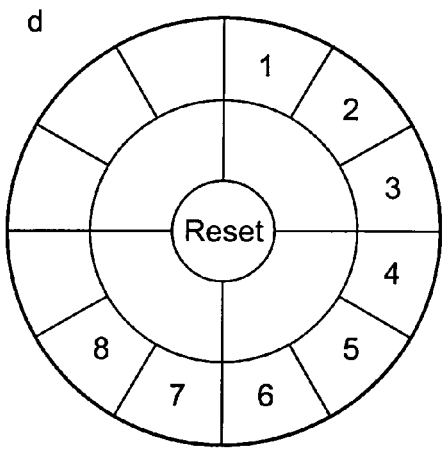
FIG. 15d is a graphical representation of the fourth cycle of the PIN Safe user interface.

For example, as seen in FIGS. 15*a*-15*d*, if the user's PIN was '2468' then on the first cycle the keyboard would be pressed when the $2^{nd}$ digit was illuminated, see FIG. 15*a*. On the second cycle the keyboard would be pressed when the $4^{th}$ digit was illuminated (see FIG. 15*b*), on the third cycle the keyboard would be pressed when the $6^{th}$ digit was illuminated (see FIG. 15*c*), and on the fourth cycle the keyboard would be pressed when the $8^{th}$ digit was illuminated (see FIG. 15*d*). Only one display is seen at any one time on the screen preventing an onlooker from determining which PIN is being inputted. Further, the changing colors of the display background and the digits displayed can be pseudo-random.

After the User presses the keyboard to register the first PIN TAC digit a random run on period of time is activated. The run on process prevents shoulder surfers from seeing exactly which digit was registered. For example, as seen in conjunction with FIG. 15*a*, when the User wishes to register the first digit, as number 2, they would press any key on the keyboard when the number 2 or second digit is highlighted, however the display continues illuminating the numbers or digits after 2 around the cycle. The system may also illuminate only a portion of the numbers after the selected number, such as between 0 to 4 digits after the selected number, before speeding up the illumination of all numbers until completion of the cycle. A shoulder surfer would see the cycle speed up after the numbers 2,3,4,5 or 6 were illuminated and would not be able to determine which digit had been registered. After the run on period, the system may increase the cycle speed to complete the cycle so that the user does not have to sit through the full cycle time to aide quick PIN entry. The run on period is normally less than the point in elapsed time from the key press to the time when the user would start to question whether a positive selection had been made. For short term visual memory, of a human, this is a maximum of around three seconds.

The run on period and increased cycle speed may be applied on all 4 cycles or displays. The dwell time between the digits being illuminated and the change in cycles is pseudo-random to prevent Trojan programs from determining which digit was inputted by correlating the display with the keyboard and the user's computer clock speed.

Figure 15E:
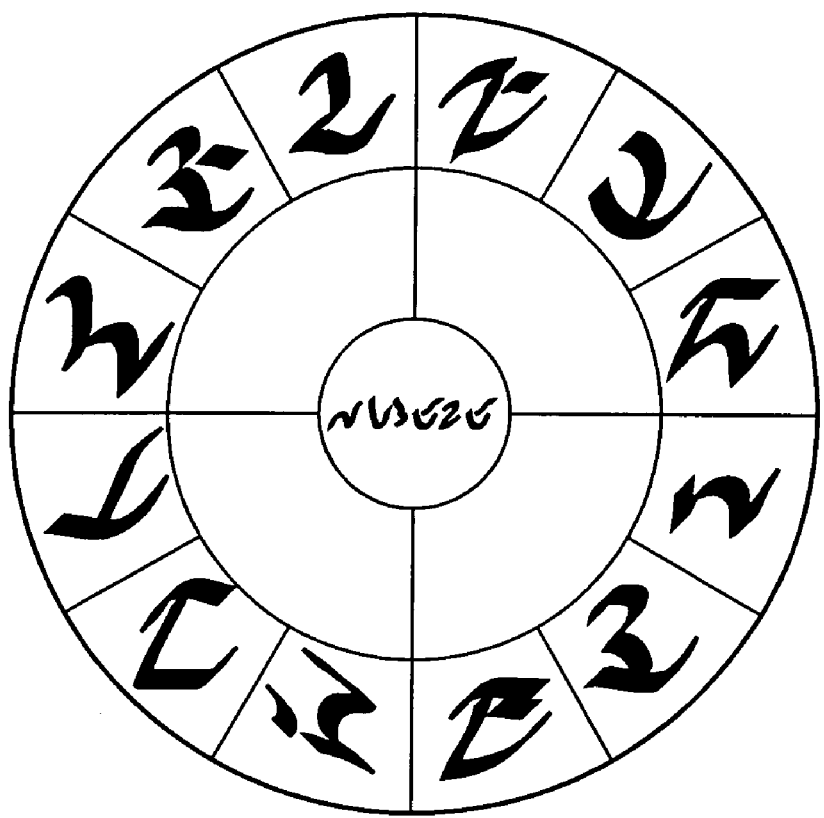
FIG. 15e is a graphical representation of the PIN Safe user interface using symbols or characters instead of numbers.

As seen in FIG. 15*e*, the Pin Safe user interface can also use characters, letters, or symbols instead of numbers on the display which would allows the user's code or pin to be any group of symbols or letters which spell a word. In addition, as previously discussed, in relation to FIG. 9, the present invention can be used for the remote access of data using either the Dual or Single Channel schema or protocol and the PIN Safe interface.

Enabling an existing database with the PIN Safe interface of the present invention can be done by providing an authentication server computer that registers the Users PIN number, issues and stores security strings, and correlates the received TAC to authenticate the user's identification.

In addition, the Pin Safe or Radar Interface can work within a computers own processor, within a local area network ("LAN") configuration, and over the Internet. Operating within a computers own processor the Pin Safe interface could act as a hack proof screensaver which means that when a user first started their computer they will be presented with the interface. The user must input their PIN accordingly and if the user decided to leave the computer for a short time, where there is the opportunity for criminal use of his computer, the user could press a function key which would activate the Pin Safe interface. Upon returning to the their computer they would simply click on their mouse or any key and enter their PIN via the Pin Safe interface.

In addition, if a user fails to input their PIN digit during any of the 4 sweep cycles, the present invention will allow the input of the PIN digit during any sweep (providied they are in the correct sequence). This means that a 'Reset' button will not require pushing unless the user has made a conscious mistake.

Additional schemas for employing the security features, measures, protocols, interfaces, and overlays of the present invention are discussed in connection with FIGS. 16-23.

Figure 16:
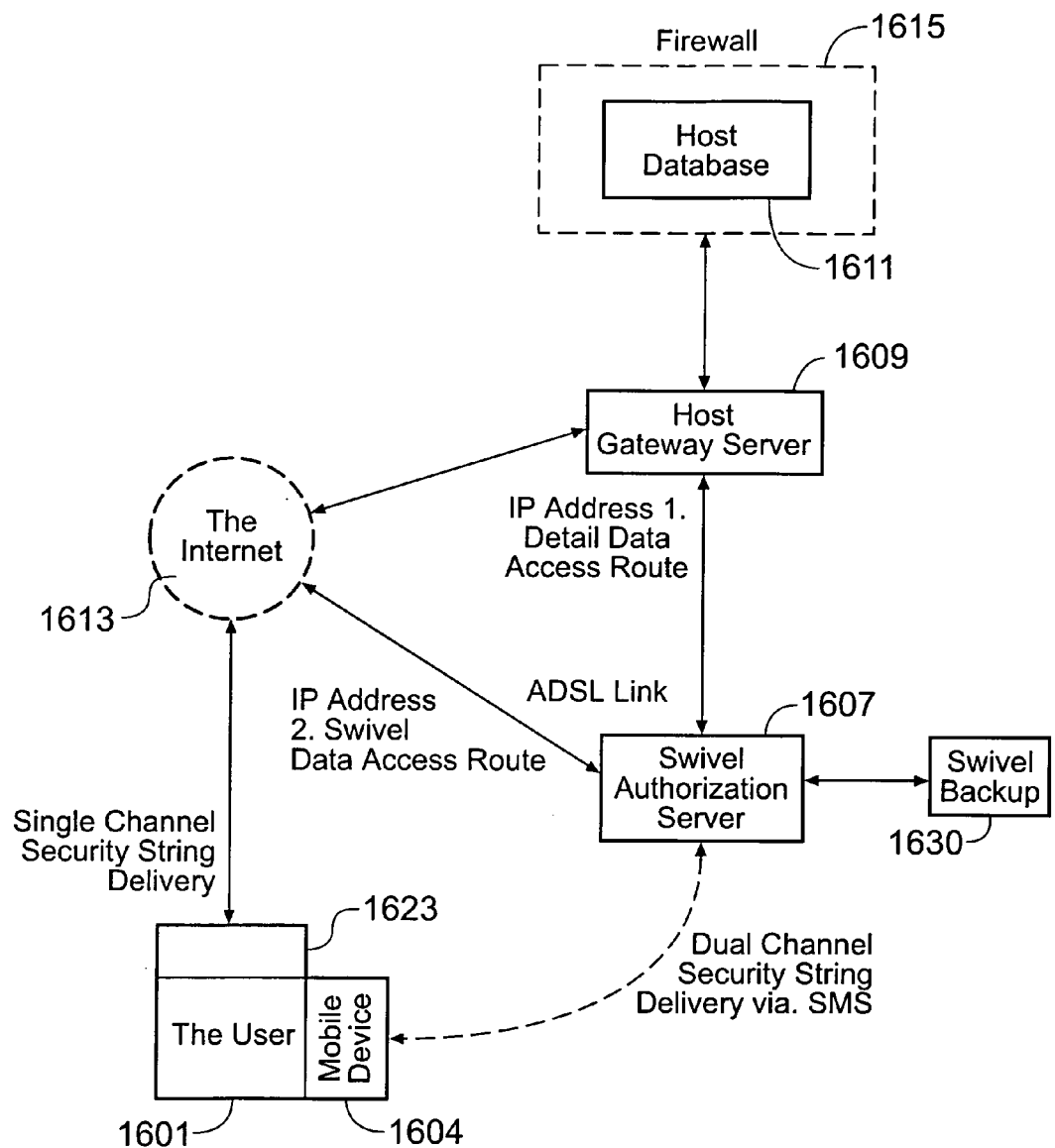
FIG. 16 is a schematic diagram showing features of the present invention utilized in a database access system via the Internet.

As seen in FIG. 16, the Authorization Server 1607 is connected directly to a Client's, Host Gateway Server 1609. The Host Gateway Server 1609 is the database's 1611 connection to the Internet 1613 and it is placed outside the firewall 1615 that surrounds the host database 1611 (this is to ensure that any hacking activity cannot occur inside the database 1611). The remote data access configuration may also employ the Pin Safe interface 1623 in conjunction with the user 1601 and the user's device 1604. The system may also employ a backup server or database 1630.

The Authorization Server 1607 can be configured to act as dual or single channel system. Its architecture allows the Host Gateway Server 1609 to allow access to the database 1611 either via the present invention or via it's existing access procedure. This means that after installation, the enabled access trials can be conducted without affecting the original configuration.

Figure 17:
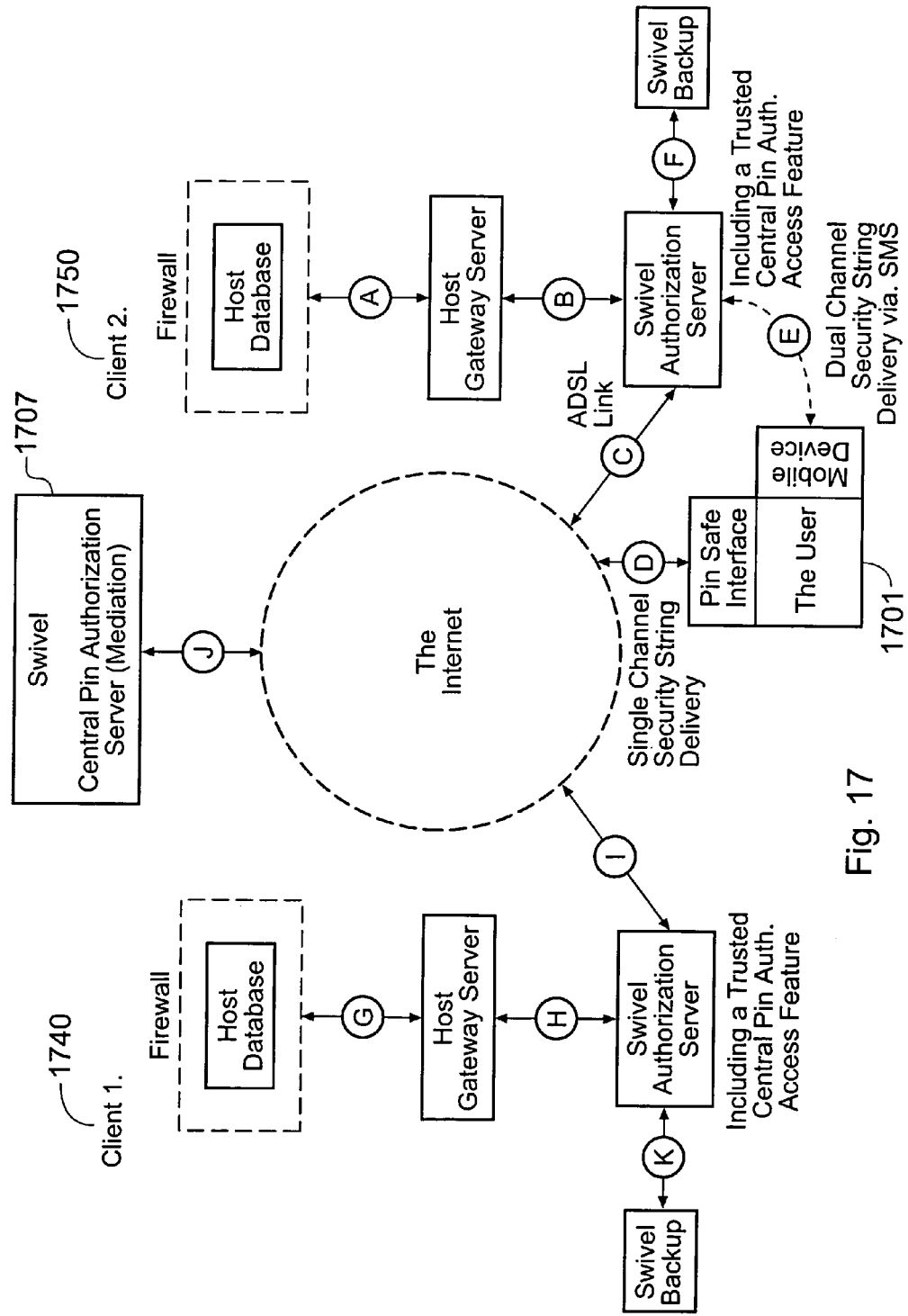
FIG. 17 is a schematic diagram containing features of the present invention utilized in the access of multiple databases via the Internet.

FIG. 17 shows how multiple Clients 1740, 1750 can be accessed from one User 1701, using one PIN number. This is achieved by installing a Central PIN Authorization Server 1707 which consolidates the received TAC's with the issued security strings from any enabled Client 1740, 1750.

Figure 18:
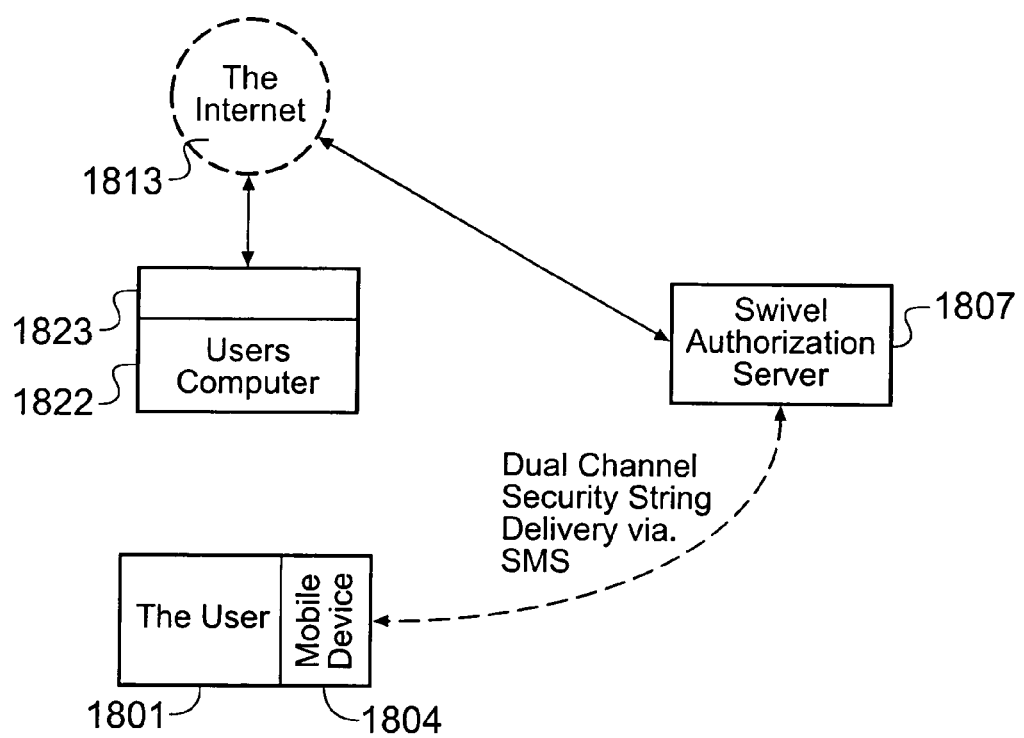
FIG. 18 is a schematic diagram illustrating various features and components of the present invention communicating via the Internet.

The Pin Safe interface can be applied various ways including the dual channel, single channel: Thin Client and single channel Applet embodiments. In the dual channel application as seen in FIG. 18, the User's TAC is inputted via the Pin Safe interface 1823 and it is sent directly to the Authorization Server 1807 through the Internet 1813. With the dual channel application no security string is sent to the Users computer 1822 and instead it is sent to the mobile device 1804 via SMS.

As seen in FIG. 18, the Security String is sent from authorization computer 1807 to the User's mobile device 1804. The user 1801 inputs the TAC via the Pin Safe interface 1823 and the Authorization Server 1807 receives the TAC via the Internet 1813.

Figure 19:
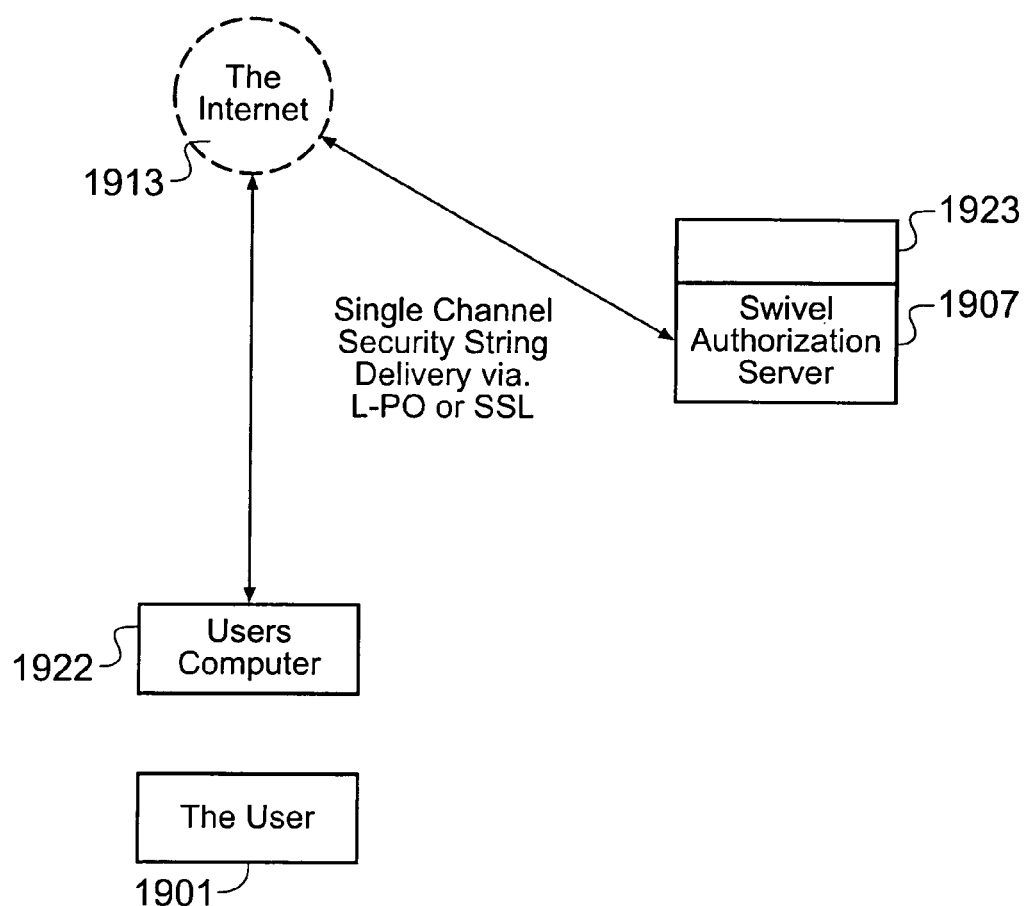
FIG. 19 is a schematic diagram illustrating various features and components of the present invention communicating via the Internet.

In the single channel Thin Client application, as seen in FIG. 19, the Pin Safe interface applet 1923 resides on the Authorization Server 1907. The User 1901 accesses this applet 1923 remotely from any computer 1922 and does not need to 'set up' the computer 1922 by pre-downloading any form of program beforehand. As seen in FIG. 19, the User accesses the Authorization Server 1907 and applet 1923 via the Internet 1913. The User 1901 inputs their PIN, which is correlated at the source or Authorization Server 1907.

Figure 20:
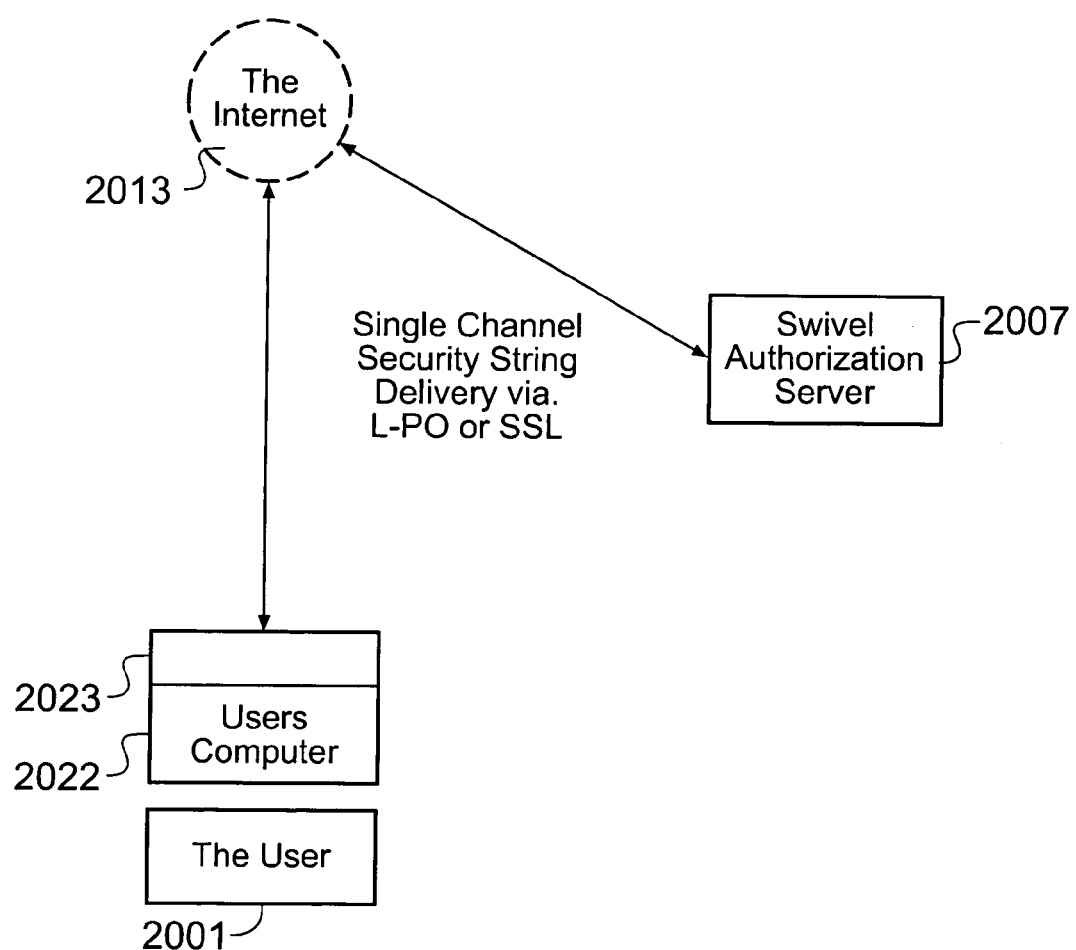
FIG. 20 is a schematic diagram of various features and components of the present invention communicating via the Internet.

In the single channel Applet application, as seen in FIG. 20, the Pin Safe interface applet 2023 resides on the users computer 2022. The applet 2023 needs downloading only once and would be automatically sent to the user's computer 2022 during the registration process. The Pin Safe interface has been specifically designed with an extremely small memory footprint making the process of downloading and use very fast.

As seen in FIG. 20, the User accesses the Authorization Server 2007 via the Internet 2013. The user 2001 inputs their PIN, which the applet 2023 converts into a TAC (it does this automatically using the volatile security string resident in the applet 2023) and then sends, via the Internet 2013, for correlation at the Authorization Server 2007.

Figure 21:
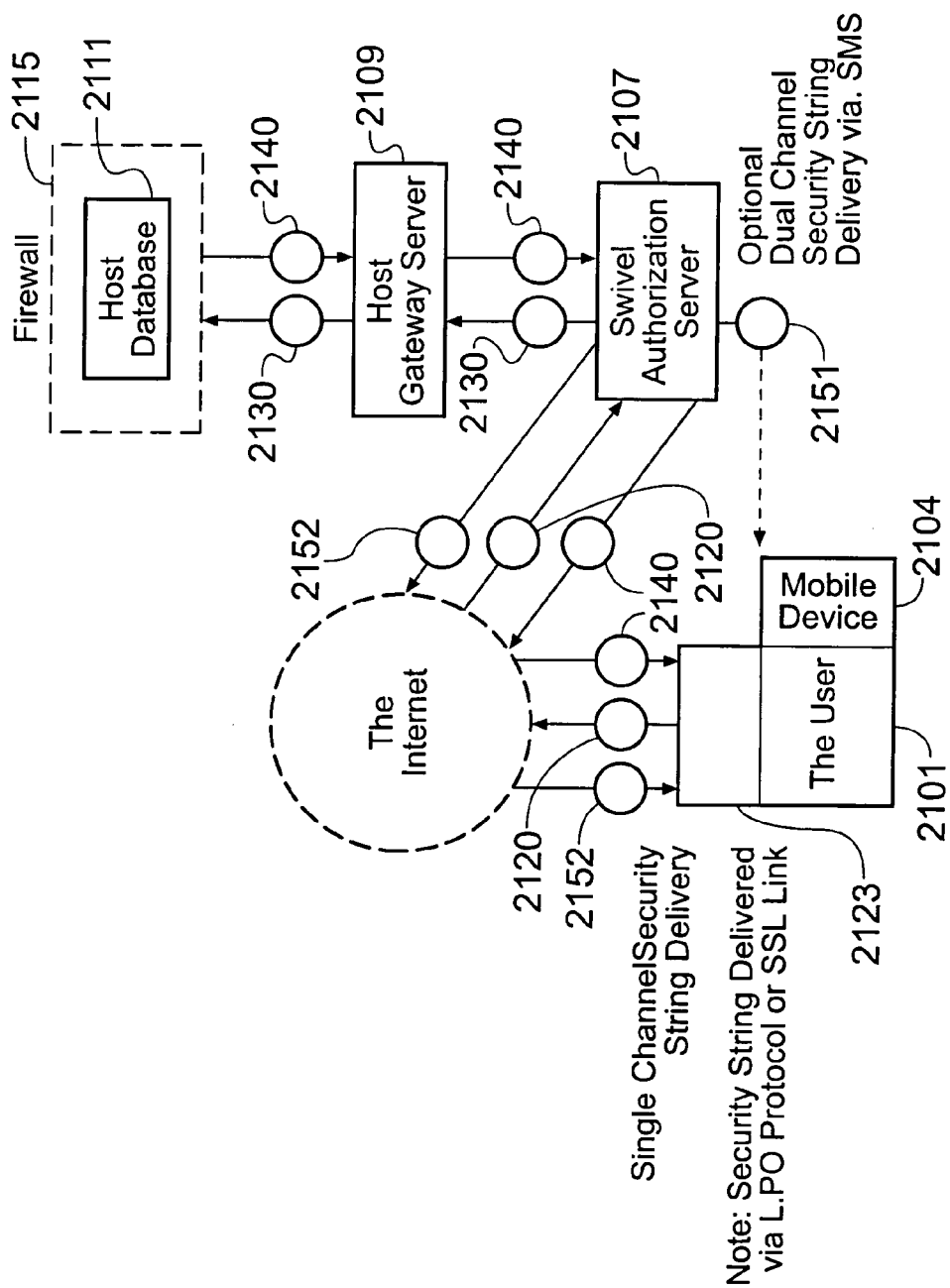
FIG. 21 is a schematic diagram illustrating the access and data channels of an additional embodiment of the present invention.

FIG. 21, shows a typical data access application where an Authorization Server 2107 has been fitted to a Gateway Server 2109 accessing a Database 2111, the Database 2111 being protected by a firewall 2115. FIG. 21 assumes that the user 2101 has registered with the system and has the Pin Safe Interface applet 2123 on their computer which allows the user 2101 to communicate with Authorization Server 2107 via the Internet 2113 using paths 2120, 2140, and 2152. To access information from the Database 2111 the Authorization Server 2107 sends a new security string to the user's computer or G2 mobile phone 2104 via the Internet 2113 or through a wireless connection 2151. The security string 2151 resides on the device 2104 until the user 2101 wishes to access the Database 2111.

The User 2101 sends his volatile TAC to the Authorization Server 2107 to confirm his/her identity. In the dual channel scenario the user obtains their TAC from the G2 mobile device 2104 via either visual extraction (using their PIN as a sequencer) or Smart PIN or standard inline memory module ("SIMM") extraction where the User 2101 enters their PIN into the device 2104 and the relevant TAC digits are displayed on the device 2104 screen. The TAC is then inputted into the user's computer (not shown). In the single channel scenario the user simply inputs their PIN into the Pin Safe interface 2123. The PIN is then converted into a TAC within the applet 2123 and transmitted via path 2120 to the Authorization Server 2107

Only when the user's identification is positively confirmed, by correlating the received TAC to the user's PIN and previously issued security String is the request 2130 for data, via the Gateway Server 2109, initialized via path 2130. The requested data can now be routed via path 2140 to the user's computer.

The Pin Safe interface is not required if the security string delivery and TAC extraction are conducted on a second device such as through the dual channel protocol. Using a G2 mobile phone a user can receive a security string and extract the TAC independent of the data accessing computer. This means that the TAC can be entered into the data accessing computer without the requirement of the Pin Safe interface because a TAC is inherently secure against shoulder surfing, Trojans, Tempest technologies and online user identification theft.

Figure 22:
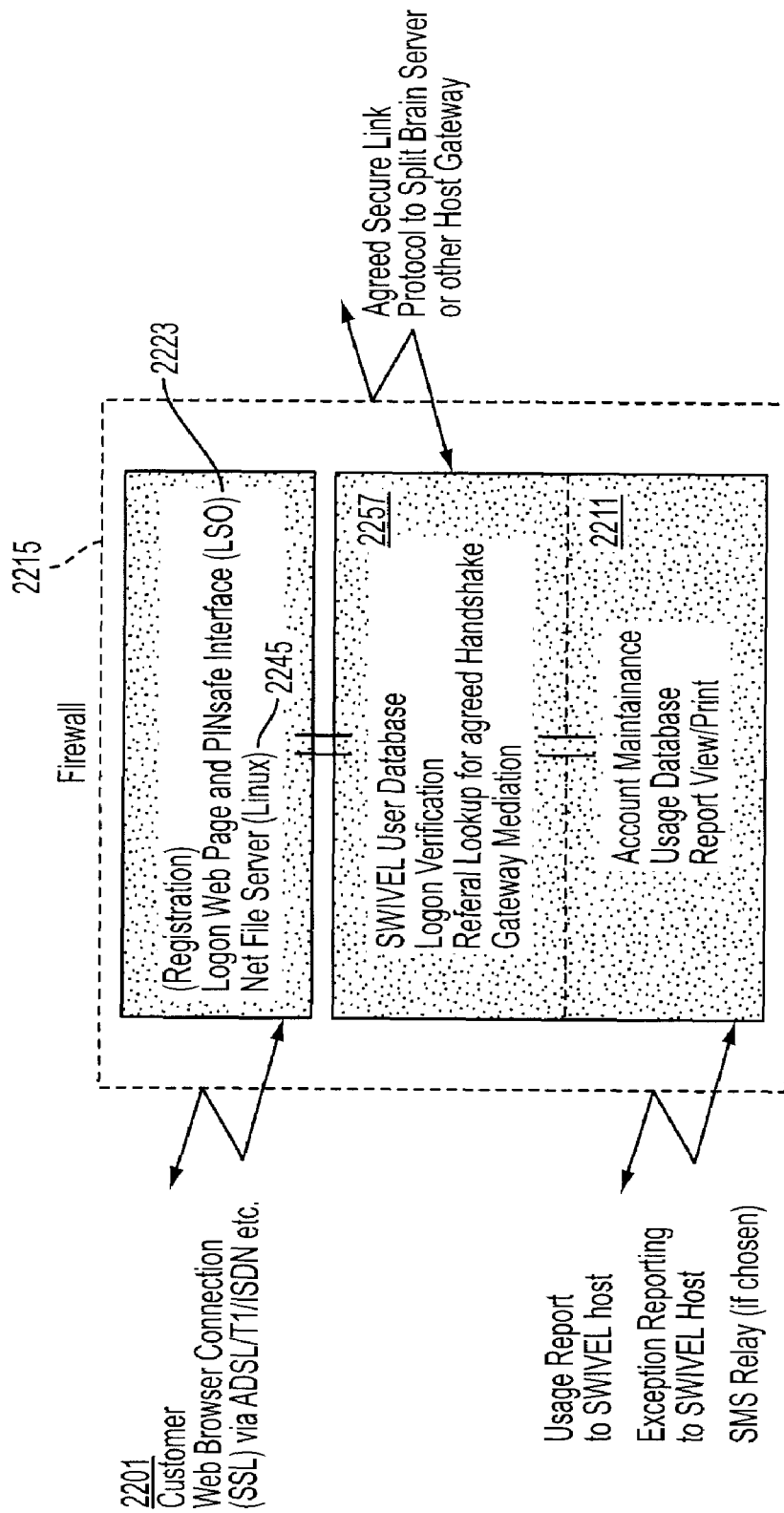
FIG. 22 represents a schematic diagram displaying a generic server gateway schema incorporating various aspects of the present invention.

FIG. 22 displays a generic Server/Gateway Schema incorporating various aspects of the present invention. The generic secure server schema may also incorporate UPS (Uninterruptible Power Supply), Dual Redundancy, Disk Mirrored, Linux Web Server 2245 and Internal Firewall 2215, the Pin Safe applet 2223, a user database 2207 and an internal maintenance any reporting function 2211.

Figure 23:
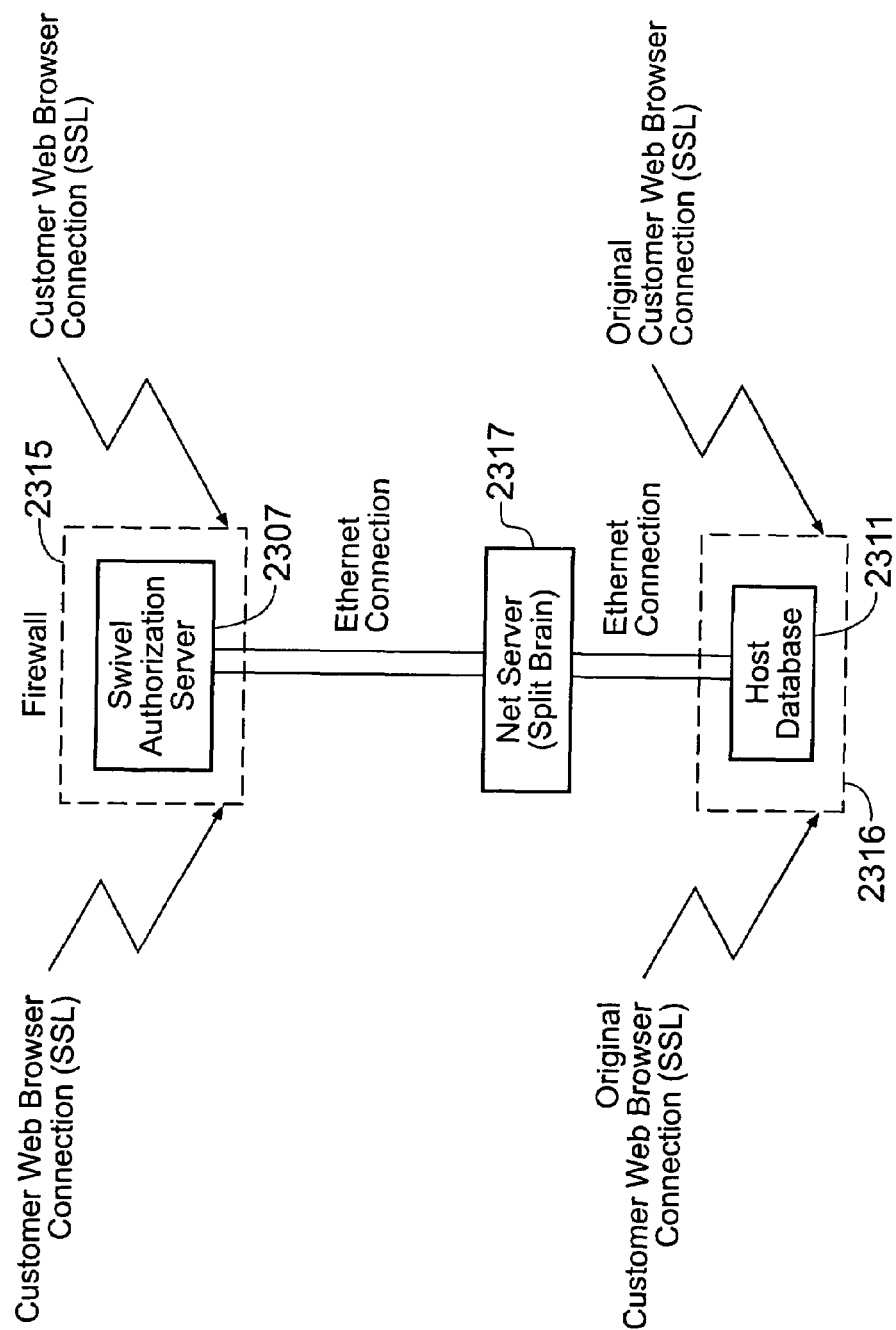
FIG. 23 shows a schematic diagram illustrating a generic integration platform of the present invention.

FIG. 23 shows the Generic Integration Platform which displays the Authorization Server 2307 inside a firewall 2315. The Authorization Server 2307 is connected to a Net Server 2317 and a host database 2311. The host database 2311 may also be inside it's own firewall 2316.

Additionally the authorization process identifies the user via a response rather than an identifying account and its parameters which negates the so called "Friendly Fraud" from misuse of online fraud guarantees. An added benefit is that there is also an audit trail for database files access.

Any reference herein to a computer means any personal computer, ATM, PDA, G2.5 Mobile Device, G3 Mobile Device, or any device with a central processing unit ("CPU"). Any reference herein to a transaction means any financial transaction, remote Data Access procedure, or any interface transaction between a user and a system. The numbers on the various user interfaces and displays are merely exemplary and the use of characters, letters, colors and such may be used individually or in combination and still fall within the intended scope of the present invention.

While the preferred embodiment and various alternative embodiments of the invention have been disclosed and described in detail herein and by way of example, it will be apparent to those skilled in the art that various changes in form and detail may be made therein without departing from the spirit and scope thereof, and that the scope of the present invention is to be limited only by the following claims.

The invention claimed is:

1. An identity verification secure transaction system comprising:
    a host computer for storing a user code associated with a user, for supplying a pseudo-random security string for a transaction, wherein said host computer determines a one time transaction code by selecting characters from said pseudo-random security string on a positional basis determined by the value of each digit of the user code; and
    at least one electronic device in electronic communication with said host computer for administering said transaction by receiving said pseudo-random security string and for transmitting a user generated transaction input code to the host computer, wherein said user generated transaction input code is determined by selecting characters from said pseudo-random security string on a positional basis determined by each digit of the user code, wherein said user generated transaction input code is sent to said host computer; and wherein said host computer verifies that said user generated input code matches said one time transaction code.

2. The system of claim 1, wherein said at least one electronic device is an Electronic Funds Transfer Point of Sale (EFT/POS) device.

3. The system of claim 1, wherein said at least one electronic device is comprised of an Electronic Funds Transfer Point of Sale (EFT/POS) device for administering said transaction and receiving said user generated transaction input code and a wireless device associated with said user for receiving and displaying said pseudo-random security string.

4. The system of claim 3, where said one time transaction code is received and displayed by said wireless device instead of said pseudo-random security string.

5. The system of claim 1, wherein said at least one electronic device is a wireless device associated with said user.

6. The system of claim 5, wherein said one time transaction code is sent to said wireless device instead of said pseudo-random security string.

7. The system of claim 1, wherein said at least one electronic device is comprised of:
   a user computer, in electronic communication with said host computer, for receiving and displaying said pseudo-random security string and receiving said user generated transaction input code; and
   a merchant computer, in electronic communication with said user computer and said host computer, for administering said transaction, wherein one of said at least one electronic device relays said user generated transaction input code to said host computer for user identity verification.

8. The system of claim 7, wherein said user computer and said merchant computer communicate via the Internet.

9. The system of claim 7, wherein said one time transaction code is received and displayed by said user computer instead of said pseudo-random security string.

10. The system of claim 1, wherein said at least one electronic device is comprised of: a wireless device associated with said user for receiving and displaying said pseudo-random security string, a user computer, in electronic communication with said host computer, for receiving said user generated transaction input code; and a merchant computer, in electronic communication with said user computer and said host computer, for administering said transaction, wherein one of said at least one electronic device relays said user generated transaction input code to said host computer for user identity verification.

11. The system of claim 10, wherein said one time transaction code is received and displayed by said wireless device instead of said pseudo-random security string.

12. The system of claim 1, wherein said host computer upon verification allows completion of said transaction.

13. The system of claim 1, wherein said host computer upon verification allows access to a database.

14. The system of claim 1, wherein said host computer upon verification allows access to account information.

15. The identity verification secure transaction system of claim 1, wherein said user interaction input code is entered through any area of a touch sensitive display.

16. The identity verification secure transaction system of claim 1, wherein said user generated transaction input code is determined by the user.

17. A method of verifying an identity for conducting secure transactions comprising the steps of:
   storing information about a user code associated with a host computer;
   generating a pseudo-random security string by said host computer;
   determining a transaction code by selecting characters from said pseudo-random security string on a positional basis determined by the value of each digit of the user code;
   transmitting said pseudo-random security string to at least one electronic device;
   displaying said pseudo-random security string on said at least one electronic device for use by said user;
   receiving from the user said user generated transaction input code on said at least one electronic device, wherein said user generated transaction input code is determined by the user selecting characters from said pseudo-random security string on a positional basis determined by each digit of the user code;
   wherein said at least one electronic device transmits said user generated transaction input code to said host computer; and
   said host computer determines whether said transaction code and said user generated transaction input code match.

18. The method of claim 17, further comprising the step of completing a transaction when said transaction code and said user generated transaction input code match.

19. The method of claim 18, further comprising the step of providing access to a database when said transaction code and said user generated transaction input code match.

20. The method of claim 18, further comprising the step of providing access to account information when said transaction code and said user generated transaction input code match.

21. The method of claim 17, further comprising the step of transmitting and displaying said pseudo-random security string on an Electronic Funds Transfer Point of Sale (EFT/POS) device.

22. The method of claim 17, further comprising the step of transmitting and displaying said pseudo-random security string on a wireless device associated with said user.

23. The method of claim 17, further comprising the step of transmitting and displaying said pseudo-random security string on a user computer wherein said user computer is in electronic communication with said host computer.

24. The method of claim 23, further comprising the step of communicating between the said host computer and said user computer via the Internet.

25. The method of claim 17, further comprising the step of transmitting and display said transaction code to said at least one electronic device.

* * * * *